US011921659B2

United States Patent
Cannata et al.

(10) Patent No.: US 11,921,659 B2
(45) Date of Patent: *Mar. 5, 2024

(54) PEER-TO-PEER COMMUNICATIONS AMONG COMMUNICATION FABRIC COUPLED ENDPOINT DEVICES

(71) Applicant: Liqid Inc., Broomfield, CO (US)

(72) Inventors: James Scott Cannata, Denver, CO (US); Christopher R. Long, Colorado Springs, CO (US); Sumit Puri, Calabasas, CA (US); Bryan Schramm, Broomfield, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,717

(22) Filed: Jan. 9, 2023

(65) Prior Publication Data

US 2023/0161720 A1    May 25, 2023

Related U.S. Application Data

(63) Continuation of application No. 17/461,149, filed on Aug. 30, 2021, now Pat. No. 11,609,873, which is a continuation of application No. 16/810,944, filed on Mar. 6, 2020, now Pat. No. 11,119,957, which is a
(Continued)

(51) Int. Cl.
*G06F 13/28* (2006.01)
*G06F 13/40* (2006.01)
*G06F 13/42* (2006.01)

(52) U.S. Cl.
CPC .......... *G06F 13/28* (2013.01); *G06F 13/4022* (2013.01); *G06F 13/4221* (2013.01); *G06F 13/4234* (2013.01); *G06F 2213/0026* (2013.01)

(58) Field of Classification Search
CPC .. G06F 13/28; G06F 13/4022; G06F 13/4221; G06F 13/4234; G06F 2213/0026
See application file for complete search history.

(56) References Cited

U.S. PATENT DOCUMENTS

| | | |
|---|---|---|
| 5,828,207 A | 10/1998 | Saadeh |
| 6,061,750 A | 5/2000 | Beardsley et al. |
| 6,325,636 B1 | 12/2001 | Hipp et al. |

(Continued)

OTHER PUBLICATIONS

Aragon, Juan L. et al., "Control Speculation for Energy-Efficient Next-Generation Superscalar Processors," IEEE Transactions on Computers, vol. 55, No. 3, pp. 281-291, Mar. 2006.

(Continued)

*Primary Examiner* — Glenn A. Auve

(57) ABSTRACT

Computing architectures, platforms, and systems are provided herein. In one example, system is provided. The system includes a management processor configured to initiate a communication arrangement between a first endpoint device coupled to a communication fabric and a second endpoint device coupled to the communication fabric. The communication arrangement is configured to redirect a transfer from the first endpoint device based on an address corresponding to an address range of the second endpoint device without passing the transfer through a host processor coupled to the communication fabric that executes an application initiating the transfer.

20 Claims, 9 Drawing Sheets

Related U.S. Application Data continuation of application No. 16/267,623, filed on Feb. 5, 2019, now Pat. No. 10,585,827.

(56)  References Cited

U.S. PATENT DOCUMENTS

| | | |
|---|---|---|
| 7,243,145 B1 | 7/2007 | Poortman |
| 7,260,487 B2 | 8/2007 | Brey et al. |
| 7,505,889 B2 | 3/2009 | Salmonsen et al. |
| 7,519,761 B2 | 4/2009 | Gregg |
| 7,606,960 B2 | 10/2009 | Munguia |
| 7,725,757 B2 | 5/2010 | Padweka et al. |
| 7,877,542 B2 | 1/2011 | Chow et al. |
| 8,045,328 B1 | 10/2011 | Chen |
| 8,125,919 B1 | 2/2012 | Khanka et al. |
| 8,150,800 B2 | 4/2012 | Webman et al. |
| 8,656,117 B1 | 2/2014 | Wong et al. |
| 8,677,180 B2 | 3/2014 | Bayer et al. |
| 8,688,926 B2 | 4/2014 | Breakstone et al. |
| 8,700,856 B2 | 4/2014 | Tanaka et al. |
| 8,732,349 B2 | 5/2014 | Kishore et al. |
| 8,880,771 B2 | 11/2014 | Subramaniyan et al. |
| 9,003,090 B1 | 4/2015 | Davis |
| 9,602,437 B1 | 3/2017 | Bernath |
| 9,612,989 B2 | 4/2017 | Eguchi et al. |
| 9,678,910 B2 | 6/2017 | Breakstone et al. |
| 9,804,988 B1 | 10/2017 | Ayoub et al. |
| 9,940,123 B1 | 4/2018 | Ayoub et al. |
| 10,585,827 B1 | 3/2020 | Cannata et al. |
| 11,119,957 B2 | 9/2021 | Cannata et al. |
| 11,609,873 B2 * | 3/2023 | Cannata .............. G06F 13/4234 |
| 2002/0059428 A1 | 5/2002 | Susai et al. |
| 2003/0110423 A1 | 6/2003 | Helms et al. |
| 2003/0126478 A1 | 7/2003 | Burns et al. |
| 2004/0156151 A1 | 8/2004 | Morrow |
| 2005/0223136 A1 | 10/2005 | Tanaka et al. |
| 2005/0257232 A1 | 11/2005 | Hidaka |
| 2006/0012950 A1 | 1/2006 | Shih |
| 2006/0123142 A1 | 6/2006 | Duncan et al. |
| 2006/0277206 A1 | 12/2006 | Bailey et al. |
| 2007/0067432 A1 | 3/2007 | Tarui et al. |
| 2008/0034153 A1 | 2/2008 | Lee et al. |
| 2008/0198744 A1 | 8/2008 | Menth |
| 2008/0281938 A1 | 11/2008 | Rai et al. |
| 2009/0006837 A1 | 1/2009 | Rothman et al. |
| 2009/0100280 A1 | 4/2009 | Lindsay |
| 2009/0190427 A1 | 7/2009 | Brittain et al. |
| 2009/0193201 A1 | 7/2009 | Brittain et al. |
| 2009/0193203 A1 | 7/2009 | Brittain et al. |
| 2009/0248941 A1 | 10/2009 | Morein et al. |
| 2009/0276551 A1 | 11/2009 | Brown et al. |
| 2010/0088467 A1 | 4/2010 | Lee et al. |
| 2010/0153621 A1 | 6/2010 | Kreiner et al. |
| 2010/0271766 A1 | 10/2010 | Lin |
| 2011/0194242 A1 | 8/2011 | Hu et al. |
| 2011/0289510 A1 | 11/2011 | Lin et al. |
| 2011/0299317 A1 | 12/2011 | Shaeffer et al. |
| 2011/0320666 A1 | 12/2011 | Gregg |
| 2011/0320759 A1 | 12/2011 | Craddock et al. |
| 2011/0320861 A1 | 12/2011 | Bayer et al. |
| 2012/0030544 A1 | 2/2012 | Fisher-Jeffes |
| 2012/0057317 A1 | 3/2012 | Lin |
| 2012/0089854 A1 | 4/2012 | Breakstone et al. |
| 2012/0126850 A1 | 5/2012 | Wasson et al. |
| 2012/0151118 A1 | 6/2012 | Flynn et al. |
| 2012/0166699 A1 | 6/2012 | Kumar et al. |
| 2012/0210163 A1 | 8/2012 | Cho |
| 2012/0317433 A1 | 12/2012 | Ellis et al. |
| 2013/0007410 A1 | 1/2013 | Kopylovitz et al. |
| 2013/0024595 A1 | 1/2013 | Subramaniyan et al. |
| 2013/0077223 A1 | 3/2013 | Xu |
| 2013/0132643 A1 | 5/2013 | Huang |
| 2013/0185416 A1 | 7/2013 | Larkin et al. |
| 2013/0254453 A1 | 9/2013 | Sato et al. |
| 2014/0047166 A1 | 2/2014 | Asnaashari et al. |
| 2014/0056319 A1 | 2/2014 | Hellwig |
| 2014/0059265 A1 | 2/2014 | Iyer et al. |
| 2014/0068127 A1 | 3/2014 | Baron et al. |
| 2014/0075235 A1 | 3/2014 | Chandhoke et al. |
| 2014/0103955 A1 | 4/2014 | Avritch et al. |
| 2014/0108846 A1 | 4/2014 | Berke et al. |
| 2014/0115223 A1 | 4/2014 | Guddeti et al. |
| 2014/0327630 A1 | 11/2014 | Burr et al. |
| 2014/0365714 A1 | 12/2014 | Sweere et al. |
| 2015/0026385 A1 | 1/2015 | Egi et al. |
| 2015/0074322 A1 | 3/2015 | Galles |
| 2015/0121115 A1 | 4/2015 | Chandra et al. |
| 2015/0143016 A1 | 5/2015 | Egi et al. |
| 2015/0186319 A1 | 7/2015 | Blevins et al. |
| 2015/0186437 A1 | 7/2015 | Molaro |
| 2015/0212755 A1 | 7/2015 | Asnaashari |
| 2015/0304423 A1 | 10/2015 | Satoyama et al. |
| 2015/0309951 A1 | 10/2015 | Breakstone et al. |
| 2015/0324118 A1 | 11/2015 | McCambridge et al. |
| 2015/0355686 A1 | 12/2015 | Heyd et al. |
| 2015/0370666 A1 | 12/2015 | Breakstone et al. |
| 2015/0371684 A1 | 12/2015 | Mataya |
| 2015/0373115 A1 | 12/2015 | Breakstone et al. |
| 2015/0382499 A1 | 12/2015 | Chiasson et al. |
| 2016/0073544 A1 | 3/2016 | Heyd et al. |
| 2016/0077976 A1 | 3/2016 | Raikin et al. |
| 2016/0197996 A1 | 7/2016 | Barton et al. |
| 2016/0248631 A1 | 8/2016 | Duchesneau |
| 2017/0147456 A1 | 5/2017 | Lee et al. |
| 2017/0308325 A1 | 10/2017 | Pearson et al. |
| 2017/0315873 A1 | 11/2017 | Alcorn et al. |
| 2017/0322605 A1 | 11/2017 | Potter et al. |
| 2017/0357609 A1 | 12/2017 | Long et al. |
| 2018/0034374 A1 | 2/2018 | Breen et al. |
| 2018/0046513 A1 | 2/2018 | Breakstone et al. |
| 2018/0181518 A1 | 6/2018 | Osqueizadeh |
| 2018/0322081 A1 | 11/2018 | Breakstone et al. |
| 2019/0050341 A1 | 2/2019 | Veal et al. |
| 2019/0087352 A1 | 3/2019 | Lee et al. |
| 2019/0243791 A1 | 8/2019 | Osqueizadeh |
| 2020/0042463 A1 | 2/2020 | Thomas |

OTHER PUBLICATIONS

Cavium, Inc., White Paper for "NVMe Direct," 5 pages, Oct. 2017.
International Application No. PCT/US2017/036739, International Search & Written Opinion, 14 pages, dated Oct. 3, 2017.
International Application No. PCT/US2017/046602, International Search Report & Written Opinion, 8 pages, dated Oct. 19, 2017.
International Application No. PCT/US2017/046607, International Search Report & Written Opinion, 7 pages, dated Oct. 23, 2017.
International Application No. PCT/US2018/028790, International Search Report & Written Opinion, 8 pages, dated Jul. 6, 2018.
International Application No. PCT/US2018/028791, International Search Report & Written Opinion, 9 pages, dated Jul. 6, 2018.
Lu, Yingping et al., "Performance Study of iSCSI-Based Storage Subsystems," IEEE Communications Magazine, pp. 76-82, Aug. 2003.
PCI-SIG, "PCI Express Basics," 40 pages, 2007.
International Application No. PCT/US2020/015555, International Search Report & Written Opinion, 8 pages, dated Apr. 24, 2020.
International Preliminary Report on Patentability for PCT Application No. PCT/US2020/015555, dated Aug. 19, 2021; 7 pages.
Extended European Search Report for EP Application No. 20752414.1; dated Sep. 22, 2022; 7 pages.

* cited by examiner

PEER-TO-PEER COMMUNICATIONS AMONG COMMUNICATION FABRIC COUPLED ENDPOINT DEVICES

RELATED APPLICATIONS

This application is a continuation of, and claims priority to, U.S. patent application Ser. No. 17/461,149, entitled "PCIe DEVICE PEER-TO-PEER COMMUNICATIONS," and filed Aug. 30, 2021; U.S. patent application Ser. No. 16/267,623, entitled "PCIe FABRIC ENABLED PEER-TO-PEER COMMUNICATIONS," and filed Feb. 5, 2019; and to U.S. patent application Ser. No. 16/810,944, entitled "PCIe DEVICE PEER-TO-PEER COMMUNICATIONS," and filed Mar. 6, 2020.

BACKGROUND

Computer systems typically include bulk storage systems, such as magnetic disk drives, optical storage devices, tape drives, or solid state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

In addition to physical space limitations, these bulk storage systems have been traditionally limited in the number of devices that can be included per host, which can be problematic in storage environments where higher capacity, redundancy, and reliability is desired. These shortcomings can be especially pronounced with the increasing data storage and retrieval needs in networked, cloud, and enterprise environments.

OVERVIEW

Computing architectures, platforms, and systems are provided herein. In one example, system is provided. The system includes a management processor configured to initiate a communication arrangement between a first endpoint device coupled to a communication fabric and a second endpoint device coupled to the communication fabric. The communication arrangement is configured to redirect a transfer from the first endpoint device based on an address corresponding to an address range of the second endpoint device without passing the transfer through a host processor coupled to the communication fabric that executes an application initiating the transfer.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
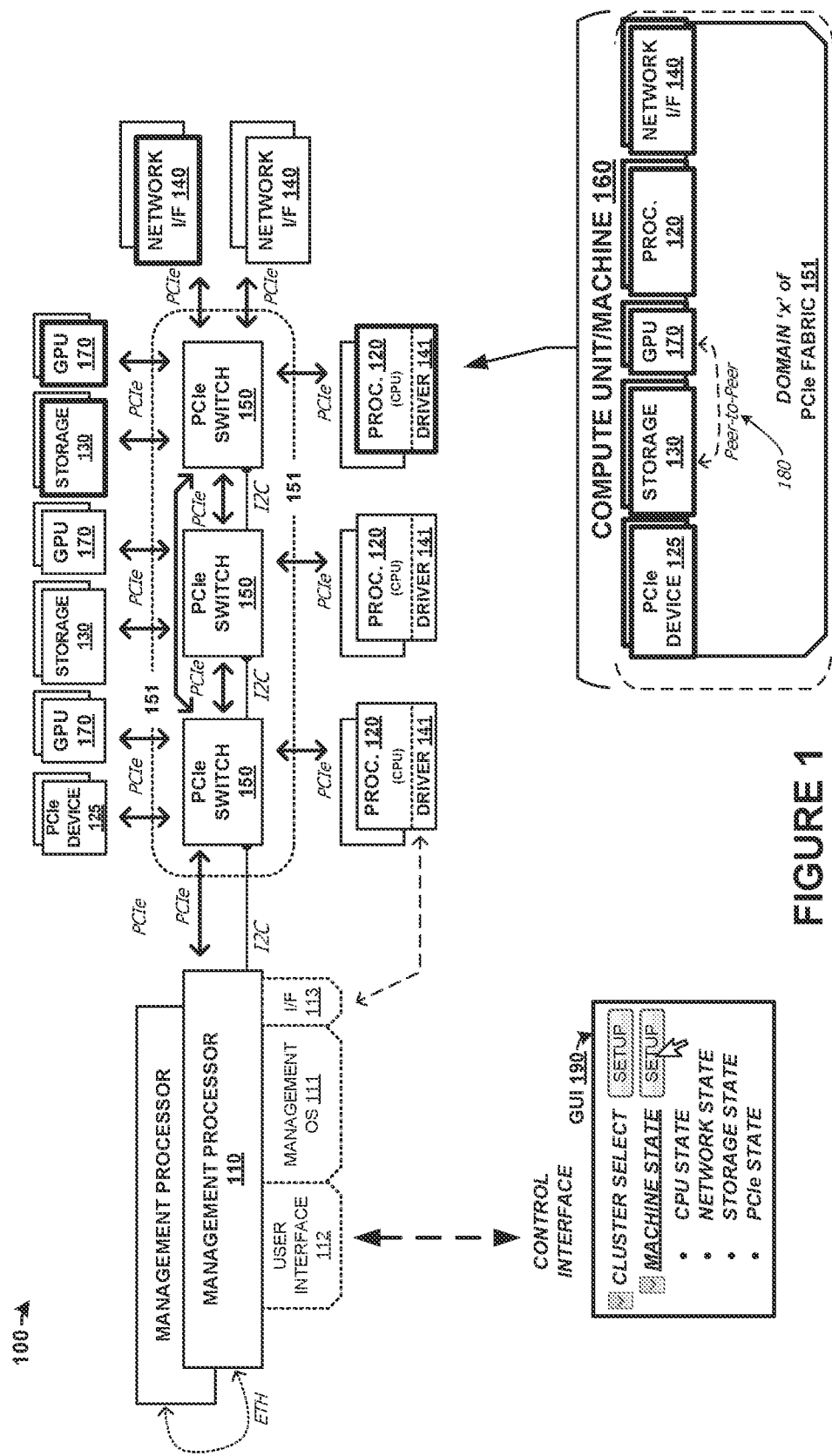
FIG. 1 is a diagram illustrating a computing platform in an implementation.

FIG. 1 is a system diagram illustrating computing platform 100. Computing platform 100 includes one or more management processors 110, and a plurality of physical computing components. The physical computing components include CPUs of processing modules 120, Peripheral Component Interconnect Express (PCIe) devices 125, storage units 130, network modules 140, PCIe switch modules 150, and graphics processing units (GPUs) 170. These physical computing components are communicatively coupled over PCIe fabric 151 formed from PCIe switch elements 150 and various corresponding PCIe links. PCIe fabric 151 configured to communicatively couple a plurality of physical computing components and establish compute units using logical partitioning within the PCIe fabric.

These compute units, referred to in FIG. 1 as machine(s) 160, can each be comprised of any number of CPUs of processing modules 120, PCIe devices 125, storage units 130, network interfaces 140 modules, and GPUs 170, including zero of any module. Some or all of the compute units 160 may be configured to provide fabric enabled peer-to-peer data transfers using peer-to-peer relationship 180. Such fabric enabled peer-to-peer data transfer functionality may be performed without relying on special capabilities of individual PCIe endpoints of the plurality of physical computing components to perform peer-to-peer data transfers.

The components of platform 100 can be included in one or more physical enclosures, such as rack-mountable units which can further be included in shelving or rack units. A predetermined number of components of platform 100 can be inserted or installed into a physical enclosure, such as a modular framework where modules can be inserted and removed according to the needs of a particular end user. An enclosed modular system, such as platform 100, can include physical support structure and enclosure that includes circuitry, printed circuit boards, semiconductor systems, and structural elements. The modules that comprise the components of platform 100 are insertable and removable from a rackmount style of enclosure. In some examples, the elements of FIG. 1 are included in a 2U chassis for mounting in a larger rackmount environment. It should be understood that the components of FIG. 1 can be included in any physical mounting environment, and need not include any associated enclosures or rackmount elements.

Once the components of platform 100 have been inserted into the enclosure or enclosures, the components can be coupled over the PCIe fabric and logically isolated into any number of separate compute units called "machines" or compute blocks. The PCIe fabric can be configured by management processor 110 to selectively route traffic among the components of a particular processor module and with external systems, while maintaining logical isolation between components not included in a particular processor module. In this way, a flexible "bare metal" configuration can be established among the components of platform 100. The individual compute blocks can be associated with external users or client machines that can utilize the computing, storage, network, or graphics processing resources of the compute block. Moreover, any number of compute blocks can be grouped into a "cluster" of compute blocks for greater parallelism and capacity. Although not shown in FIG. 1 for clarity, various power supply modules and associated power and control distribution links can also be included.

Turning now to the components of platform 100, management processor 110 can comprise one or more microprocessors and other processing circuitry that retrieves and executes software, such as user interface 112 and management operating system 111, from an associated storage system. Processor 110 can be implemented within a single processing device but can also be distributed across multiple processing devices or sub-systems that cooperate in executing program instructions. Examples of processor 110 include general purpose central processing units, application specific processors, and logic devices, as well as any other type of processing device, combinations, or variations thereof. In some examples, processor 110 comprises an Intel® or AMD® microprocessor, ARM® microprocessor, field-programmable gate array (FPGA), application specific integrated circuit (ASIC), application specific processor, or other microprocessor or processing elements.

In FIG. 1, processor 110 provides interface 113. Interface 113 comprises a communication link between processor 110 and any component coupled to PCIe fabric 151, which may comprise a PCIe link. In some examples, this interface may employ Ethernet traffic transported over a PCIe link. Additionally, each processing module 120 in FIG. 1 is configured with driver 141 which may provide for Ethernet communication over PCIe links. Thus, any of processing module 120 and management processor 110 can communicate over Ethernet that is transported over the PCIe fabric. However, implementations are not limited to Ethernet over PCIe and other communication interfaces may be used, including standard PCIe traffic over PCIe interfaces.

A plurality of processing modules 120 are included in platform 100. Each processing module 120 includes one or more CPUs or microprocessors and other processing circuitry that retrieves and executes software, such as driver 141 and any number of end user applications, from an associated storage system. Each processing module 120 can be implemented within a single processing device but can also be distributed across multiple processing devices or sub-systems that cooperate in executing program instructions. Examples of each processing module 120 include general purpose central processing units, application specific processors, and logic devices, as well as any other type of processing device, combinations, or variations thereof. In some examples, each processing module 120 comprises an Intel® or AMD® microprocessor, ARM® microprocessor, graphics processor, compute cores, graphics cores, application specific integrated circuit (ASIC), field-programmable gate array (FPGA), or other microprocessor or processing elements. Each processing module 120 can also communicate with other compute units, such as those in a same storage assembly/enclosure or another storage assembly/enclosure over one or more PCIe interfaces and PCIe fabric 151.

PCIe devices 125 comprise one or more instances of specialized circuitry, ASIC circuitry, or FPGA circuitry, among other circuitry. PCIe devices 125 each include a PCIe interface comprising one or more PCIe lanes. These PCIe interfaces can be employed to communicate over PCIe fabric 151. PCIe devices 125 can include processing components, memory components, storage components, interfacing components, among other components. PCIe devices 125 might comprise PCIe endpoint devices or PCIe host devices which may or may not have a root complex.

When PCIe devices 125 comprise FPGA devices, example implementations can include Xilinx® Alveo™ (U200/U250/U280) devices, or other FPGA devices which include PCIe interfaces. FPGA devices, when employed in PCIe devices 125, can receive processing tasks from another PCIe device, such as a CPU or GPU, to offload those processing tasks into the FPGA programmable logic circuitry. An FPGA is typically initialized into a programmed state using configuration data, and this programmed state includes various logic arrangements, memory circuitry, registers, processing cores, specialized circuitry, and other features which provide for specialized or application-specific circuitry. FPGA devices can be re-programmed to change the circuitry implemented therein, as well as to perform a different set of processing tasks at different points in time. FPGA devices can be employed to perform machine learning tasks, implement artificial neural network circuitry, implement custom interfacing or glue logic, perform encryption/decryption tasks, perform block chain calculations and processing tasks, or other tasks. In some examples, a CPU will provide data to be processed by the FPGA over a PCIe interface to the FPGA. The FPGA can process this data to produce a result and provide this result over the PCIe interface to the CPU. More than one CPU and/or FPGA might be involved to parallelize tasks over more than one device or to serially process data through more than one device.

The management processor 110 may include a configuration data storage, among other configuration data. In some examples, PCIe devices 125 include locally-stored configuration data which may be supplemented, replaced, or overridden using configuration data stored in the configuration data storage. This configuration data can comprise firmware, programmable logic programs, bitstreams, or objects, PCIe device initial configuration data, among other configuration data discussed herein. When PCIe devices 125 include FPGA devices, such as FPGA chips, circuitry, and logic, PCIe devices 125 might also include static random-access memory (SRAM) devices, programmable read-only memory (PROM) devices used to perform boot programming, power-on configuration, or other functions to establish an initial configuration for the FPGA device. In some examples, the SRAM or PROM devices can be incorporated into FPGA circuitry.

A plurality of storage units 130 are included in platform 100. Each storage unit 130 includes one or more storage drives, such as solid state drives in some examples. Each storage unit 130 also includes PCIe interfaces, control processors, and power system elements. Each storage unit 130 also includes an on-sled processor or control system for traffic statistics and status monitoring, among other operations. Each storage unit 130 comprises one or more solid state memory devices with a PCIe interface. In yet other examples, each storage unit 130 comprises one or more separate solid state drives (SSDs) or magnetic hard disk drives (HDDs) along with associated enclosures and circuitry.

A plurality of graphics processing units (GPUs) 170 are included in platform 100. Each GPU comprises a graphics processing resource that can be allocated to one or more compute units. The GPUs can comprise graphics processors, shaders, pixel render elements, frame buffers, texture mappers, graphics cores, graphics pipelines, graphics memory, or other graphics processing and handling elements. In some examples, each GPU 170 comprises a graphics 'card' comprising circuitry that supports a GPU chip. Example GPU cards include nVIDIA® Jetson cards that include graphics processing elements and compute elements, along with various support circuitry, connectors, and other elements. In further examples, other style of graphics processing units or graphics processing assemblies can be employed, such as machine learning processing units, tensor processing units (TPUs), or other specialized processors that may include similar elements as GPUs but lack rendering components to focus processing and memory resources on processing of data.

Network interfaces 140 include network interface cards for communicating over TCP/IP (Transmission Control Protocol (TCP)/Internet Protocol) networks or for carrying user traffic, such as iSCSI (Internet Small Computer System Interface) or NVMe (NVM Express) traffic for storage units 130 or other TCP/IP traffic for processing modules 120. Network interfaces 140 can comprise Ethernet interface equipment, and can communicate over wired, optical, or wireless links. External access to components of platform 100 is provided over packet network links provided by network interfaces 140. Network interfaces 140 communicate with other components of platform 100, such as processing modules 120, PCIe devices 125, and storage units 130 over associated PCIe links and PCIe fabric 151. In some examples, network interfaces are provided for intra-system network communication among for communicating over Ethernet networks for exchanging communications between any of processing modules 120 and management processors 110.

Each PCIe switch 150 communicates over associated PCIe links. In the example in FIG. 1, PCIe switches 150 can be used for carrying user data between PCIe devices 125, network interfaces 140, storage modules 130, and processing modules 120. Each PCIe switch 150 comprises a PCIe cross connect switch for establishing switched connections between any PCIe interfaces handled by each PCIe switch 150. In some examples, each PCIe switch 150 comprises a PLX Technology PEX8725 10-port, 24 lane PCIe switch chip. In other examples, each PCIe switch 150 comprises a PLX Technology PEX8796 24-port, 96 lane PCIe switch chip.

The PCIe switches discussed herein can comprise PCIe crosspoint switches, which logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by processor 110 which logically integrate components into associated compute units 160 of a particular cluster and logically isolate components and compute units among different clusters. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

Advantageously, this NT port-based segregation or domain-based segregation can allow physical components (i.e. CPU, GPU, storage, network) only to have visibility to those components that are included via the segregation/partitioning. Thus, groupings among a plurality of physical components can be achieved using logical partitioning among the PCIe fabric. This partitioning is scalable in nature, and can be dynamically altered as-needed by a management processor or other control elements. The management processor can control PCIe switch circuitry that comprises the PCIe fabric to alter the logical partitioning or segregation among PCIe ports and thus alter composition of groupings of the physical components. These groupings, referred herein as compute units, can individually form "machines" and can be further grouped into clusters of many compute units/machines. Physical components, such as storage drives, processors, or network interfaces, can be added to or removed from compute units according to user instructions received over a user interface, dynamically in response to loading/idle conditions, or preemptively due to anticipated need, among other considerations discussed herein.

As used herein, unless specified otherwise, domain and partition are intended to be interchangeable and may include similar schemes referred to by one of skill in the art as either domain and partition in PCIe and similar network technology. Further, as used herein, unless specified otherwise, segregating and partitioning are intended to be interchangeable and may include similar schemes referred to by one of skill in the art as either segregating and partitioning in PCIe and similar network technology.

PCIe can support multiple bus widths, such as x1, x2, x4, x8, x16, and x32, with each multiple of bus width comprising an additional "lane" for data transfer. PCIe also supports transfer of sideband signaling, such as System Management Bus (SMBus) interfaces, as well as associated clocks, power, and bootstrapping, among other signaling. PCIe also might have different implementations or versions employed herein.

For example, PCIe version 3.0 or later (e.g. 4.0, 5.0, and later) might be employed. Moreover, next-generation interfaces can be employed, such as Cache Coherent Interconnect for Accelerators (CCIX), or Open Coherent Accelerator Processor Interface (OpenCAPI). Also, although PCIe is used in FIG. 1, it should be understood that different communication links or busses can instead be employed, such as NVMe, Ethernet, Serial Attached SCSI (SAS), Gen-Z, FibreChannel, Thunderbolt, Serial Attached ATA Express (SATA Express), among other interconnect, network, and link interfaces. NVMe (NVM Express) is an interface standard for mass storage devices, such as hard disk drives and solid state memory devices. NVMe can supplant serial ATA (SATA) interfaces for interfacing with mass storage devices in personal computers and server environments. However, these NVMe interfaces are limited to one-to-one host-drive relationship, similar to SATA devices. In the examples discussed herein, a PCIe interface can be employed to transport NVMe traffic and present a multi-drive system comprising many storage drives as one or more NVMe virtual logical unit numbers (VLUNs) over a PCIe interface.

Any of the links in FIG. 1 can each use various communication media, such as air, space, metal, optical fiber, or some other signal propagation path, including combinations thereof. Any of the links in FIG. 1 can include any number of PCIe links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

In FIG. 1, any processing module 120 has configurable logical visibility to any/all storage units 130, GPU 170, PCIe devices 125, or other physical components of platform 100, as segregated logically by the PCIe fabric. Any processing module 120 can transfer data for storage on any storage unit 130 and retrieve data stored on any storage unit 130. Thus, 'm' number of storage drives can be coupled with 'n' number of processors to allow for a large, scalable architecture with a high-level of redundancy and density. Furthermore, any processing module 120 can transfer data for processing by any GPU 170 or PCIe devices 125, or hand off control of any GPU or FPGA to another processing module 120.

To provide visibility of each processing module 120 to any PCIe device 125, storage unit 130, or GPU 170, various techniques can be employed. In a first example, management processor 110 establishes a cluster that includes one or more compute units 160. These compute units comprise one or more processing modules 120, zero or more PCIe devices 125, zero or more storage units 130, zero or more network interface units 140, and zero or more graphics processing units 170. Elements of these compute units are communicatively coupled by portions of PCIe fabric 151. Once compute units 160 have been assigned to a particular cluster, further resources can be assigned to that cluster, such as storage resources, graphics processing resources, and network interface resources, among other resources. Management processor 110 can instantiate/bind a subset number of the total quantity of storage resources of platform 100 to a particular cluster and for use by one or more compute units 160 of that cluster. For example, 16 storage drives spanning 4 storage units might be assigned to a group of two compute units 160 in a cluster. The compute units 160 assigned to a cluster then handle transactions for that subset of storage units, such as read and write transactions.

Each compute unit 160, specifically each processor of the compute unit, can have memory-mapped or routing-table based visibility to the storage units or graphics units within that cluster, while other units not associated with a cluster are generally not accessible to the compute units until logical visibility is granted. Moreover, each compute unit might only manage a subset of the storage or graphics units for an associated cluster. Storage operations or graphics processing operations might, however, be received over a network interface associated with a first compute unit that are managed by a second compute unit. When a storage operation or graphics processing operation is desired for a resource unit not managed by a first compute unit (i.e. managed by the second compute unit), the first compute unit uses the memory mapped access or routing-table based visibility to direct the operation to the proper resource unit for that transaction, by way of the second compute unit. The transaction can be transferred and transitioned to the appropriate compute unit that manages that resource unit associated with the data of the transaction. For storage operations, the PCIe fabric is used to transfer data between compute units/processors of a cluster so that a particular compute unit/processor can store the data in the storage unit or storage drive that is managed by that particular compute unit/processor, even though the data might be received over a network interface associated with a different compute unit/processor. For graphics processing operations, the PCIe fabric is used to transfer graphics data and graphics processing commands between compute units/processors of a cluster so that a particular compute unit/processor can control the GPU or GPUs that are managed by that particular compute unit/processor, even though the data might be received over a network interface associated with a different compute unit/processor. Thus, while each particular compute unit of a cluster actually manages a subset of the total resource units (such as storage drives in storage units or graphics processors in graphics units), all compute units of a cluster have visibility to, and can initiate transactions to, any of resource units of the cluster. A managing compute unit that manages a particular resource unit can receive re-transferred transactions and any associated data from an initiating compute unit by at least using a memory-mapped address space or routing table to establish which processing module handles storage operations for a particular set of storage units.

In graphics processing examples, NT partitioning or domain-based partitioning in the switched PCIe fabric can be provided by one or more of the PCIe switches with NT ports or domain-based features. This partitioning can ensure that GPUs can be interworked with a desired compute unit and that more than one GPU, such as more than eight (8) GPUs can be associated with a particular compute unit. Moreover, dynamic GPU-compute unit relationships can be adjusted on-the-fly using partitioning across the PCIe fabric. Shared network resources can also be applied across compute units for graphics processing elements. For example, when a first compute processor determines that the first compute processor does not physically manage the graphics unit associated with a received graphics operation, then the first compute processor transfers the graphics operation over the PCIe fabric to another compute processor of the cluster that does manage the graphics unit.

In further examples, memory mapped direct memory access (DMA) conduits can be formed between individual CPU/PCIe device pairs. This memory mapping can occur over the PCIe fabric address space, among other configurations. To provide these DMA conduits over a shared PCIe fabric comprising many CPUs and GPUs, the logical partitioning described herein can be employed. Specifically, NT ports or domain-based partitioning on PCIe switches can isolate individual DMA conduits among the associated CPUs/GPUs.

In FPGA-based processing examples, NT partitioning or domain-based partitioning in the switched PCIe fabric can be provided by one or more of the PCIe switches with NT ports or domain-based features. This partitioning can ensure that PCIe devices comprising FPGA devices can be interworked with a desired compute unit and that more than one FPGA can be associated with a particular compute unit. Moreover, dynamic FPGA-compute unit relationships can be adjusted on-the-fly using partitioning across the PCIe fabric. Shared network resources can also be applied across compute units for FPGA processing elements. For example, when a first compute processor determines that the first compute processor does not physically manage the FPGA associated with a received FPGA operation, then the first compute processor transfers the FPGA operation over the PCIe fabric to another compute processor of the cluster that does manage the FPGA. In further examples, memory mapped direct memory access (DMA) conduits can be formed between individual CPU/FPGA pairs. This memory mapping can occur over the PCIe fabric address space, among other configurations. To provide these DMA conduits over a shared PCIe fabric comprising many CPUs and FPGAs, the logical partitioning described herein can be employed. Specifically, NT ports or domain-based partitioning on PCIe switches can isolate individual DMA conduits among the associated CPUs/FPGAs.

In storage operations, such as a write operation, data can be received over network interfaces 140 of a particular cluster by a particular processor of that cluster. Load balancing or other factors can allow any network interface of that cluster to receive storage operations for any of the processors of that cluster and for any of the storage units of that cluster. For example, the write operation can be a write operation received over a first network interface 140 of a first cluster from an end user employing an iSCSI protocol or NVMe protocol. A first processor of the cluster can receive the write operation and determine if the first processor manages the storage drive or drives associated with the write operation, and if the first processor does, then the first processor transfers the data for storage on the associated storage drives of a storage unit over the PCIe fabric. The individual PCIe switches 150 of the PCIe fabric can be configured to route PCIe traffic associated with the cluster among the various storage, processor, and network elements of the cluster, such as using domain-based routing or NT ports. If the first processor determines that the first processor does not physically manage the storage drive or drives associated with the write operation, then the first processor transfers the write operation to another processor of the cluster that does manage the storage drive or drives over the PCIe fabric. Data striping can be employed by any processor to stripe data for a particular write transaction over any number of storage drives or storage units, such as over one or more of the storage units of the cluster.

In this example, PCIe fabric 151 associated with platform 100 has 64-bit address spaces, which allows an addressable space of $2^{64}$ bytes, leading to at least 16 exbibytes of byte-addressable memory. The 64-bit PCIe address space can be shared by all compute units or segregated among various compute units forming clusters for appropriate memory mapping to resource units. Individual PCIe switches 150 of the PCIe fabric can be configured to segregate and route PCIe traffic associated with particular clusters among the various storage, compute, graphics processing, and network elements of the cluster. This segregation and routing can be establishing using domain-based routing or NT ports to establish cross-point connections among the various PCIe switches of the PCIe fabric. Redundancy and failover pathways can also be established so that traffic of the cluster can still be routed among the elements of the cluster when one or more of the PCIe switches fails or becomes unresponsive. In some examples, a mesh configuration is formed by the PCIe switches of the PCIe fabric to ensure redundant routing of PCIe traffic.

Management processor 110 controls the operations of PCIe switches 150 and PCIe fabric 151 over one or more interfaces, which can include inter-integrated circuit (I2C) interfaces that communicatively couple each PCIe switch of the PCIe fabric. Management processor 110 can establish NT-based or domain-based segregation among a PCIe address space using PCIe switches 150. Each PCIe switch can be configured to segregate portions of the PCIe address space to establish cluster-specific partitioning. Various configuration settings of each PCIe switch can be altered by management processor 110 to establish the domains and cluster segregation. In some examples, management processor 110 can include a PCIe interface and communicate/configure the PCIe switches over the PCIe interface or sideband interfaces transported within the PCIe protocol signaling.

In some embodiments, while establishing compute unit 160 (e.g. compute unit 160 of domain 'x' of PCIe fabric 151), management processor 110 may configure one or more PCIe switches 150 communicatively coupling the physical components of the domain to provide functionality for peer-to-peer data transfers using peer-to-peer relationship 180. In some cases, peer-to-peer data transfers may operate without needing the PCIe endpoint devices to have such functionality provided, for example, by the manufacturer. In some examples, management processor 110 may configure the PCIe switches to perform monitoring of the PCIe data traffic to trap and redirect detected data transfers to a proper PCIe endpoint device without passing through the host processor or the host processor memory. For example, host processor 120 may establish address ranges associated with peer-to-peer data transfers for one or more of the PCIe endpoint devices of the domain (e.g. during or following PCIe enumeration). In some examples, the address ranges may be in addition to addresses or address ranges assigned to the PCIe devices by an operating system during normal PCIe enumeration. Further, the address ranges associated with peer-to-peer data transfers may be virtual PCIe address ranges that are each associated with a corresponding PCIe device of a compute unit. The PCIe switches may establish and populate address traps to monitor and redirect data transfers directed to the address ranges associated with peer-to-peer data transfers. The host processor may then issue instructions to the PCIe endpoint devices to perform peer-to-peer data transfers as, for example, normal direct memory access (DMA) data transfers but instruct the endpoint devices to use the addresses within address ranges associated with peer-to-peer data transfers when fulfilling the request. The address traps in the PCIe switches may then detect and redirect the data transfers to the physical PCIe addresses of the destination PCIe device associated with the detected address range. Additional discussion of this functionality is provided below.

Management operating system (OS) 111 is executed by management processor 110 and provides for management of resources of platform 100. The management includes creation, alteration, and monitoring of one or more clusters comprising one or more compute units. Management OS 111 provides for the functionality and operations described herein for management processor 110.

Management processor 110 also includes user interface 112, which can present graphical user interface (GUI) 190 to one or more users. User interface 112 and GUI 190 can be employed by end users or administrators to establish clusters, assign assets (compute units/machines) to each cluster. In FIG. 1, GUI 190 allows end users to create and administer clusters as well as assign one or more machine/compute units to the clusters. In some examples, the user interface 112 and GUI 190 may allow the end user to determine what PCIe fabric enabled peer-to-peer data transfers are to be enabled within the domain. GUI 190 provides telemetry information for the operation of system 100 to end users, such as in one or more status interfaces or status views. The state of various components or elements of system 100 can be monitored through GUI 190, such as processor/CPU state, network state, storage unit state, PCIe element state, among others. User interface 112 can provide other user interfaces than GUI 190, such as command line interfaces, application programming interfaces (APIs), or other interfaces. In some examples, GUI 190 is provided over a websockets-based interface.

One or more management processors can be included in a system, such as when each management processor can manage resources for a predetermined number of clusters or compute units. User commands, such as those received over a GUI, can be received into any of the management processors of a system and forwarded by the receiving management processor to the handling management processor. Each management processor can have a unique or pre-assigned identifier which can aid in delivery of user commands to the proper management processor. Additionally, management processors can communicate with each other, such as using a mailbox process or other data exchange technique. This communication can occur over dedicated sideband interfaces, such as I2C interfaces, or can occur over PCIe or Ethernet interfaces that couple each management processor.

Management OS 111 also includes emulated network interface 113. Emulated network interface 113 comprises a transport mechanism for transporting network traffic over one or more PCIe interfaces. Emulated network interface 113 can emulate a network device, such as an Ethernet device, to management processor 110 so that management processor 110 can interact/interface with any of processing modules 120 over a PCIe interface as if the processor was communicating over a network interface. Emulated network interface 113 can comprise a kernel-level element or module which allows management OS 111 to interface using Ethernet-style commands and drivers. Emulated network interface 113 allows applications or OS-level processes to communicate with the emulated network device without having associated latency and processing overhead associated with a network stack. Emulated network interface 113 comprises a software component, such as a driver, module, kernel-level module, or other software component that appears as a network device to the application-level and system-level software executed by the processor device.

In the examples herein, network interface 113 advantageously does not require network stack processing to transfer communications. Instead, emulated network interface 113 transfers communications as associated traffic over a PCIe interface or PCIe fabric to another emulated network device. Emulated network interface 113 does not employ network stack processing yet still appears as network device to the operating system of an associated processor, so that user software or operating system elements of the associated processor can interact with network interface 113 and communicate over a PCIe fabric using existing network-facing communication methods, such as Ethernet communications.

Emulated network interface 113 translates PCIe traffic into network device traffic and vice versa. Processing communications transferred to the network device over a network stack is omitted, where the network stack would typically be employed for the type of network device/interface presented. For example, the network device might be presented as an Ethernet device to the operating system or applications. Communications received from the operating system or applications are to be transferred by the network device to one or more destinations. However, emulated network interface 113 does not include a network stack to process the communications down from an application layer down to a link layer. Instead, emulated network interface 113 extracts the payload data and destination from the communications received from the operating system or applications and translates the payload data and destination into PCIe traffic, such as by encapsulating the payload data into PCIe frames using addressing associated with the destination.

Management driver 141 is included on each processing module 120. Management driver 141 can include emulated network interfaces, such as discussed for emulated network interface 113. Additionally, management driver 141 monitors operation of the associated processing module 120 and software executed by a CPU of processing module 120 and provides telemetry for this operation to management processor 110. Thus, any user provided software can be executed by CPUs of processing modules 120, such as user-provided operating systems (Windows, Linux, MacOS, Android, iOS, etc. . . . ) or user application software and drivers. Management driver 141 provides functionality to allow each processing module 120 to participate in the associated compute unit and/or cluster, as well as provide telemetry data to an associated management processor. Each processing module 120 can also communicate with each other over an emulated network device that transports the network traffic over the PCIe fabric. Driver 141 also provides an API for user software and operating systems to interact with driver 141 as well as exchange control/telemetry signaling with management processor 110.

In some examples, management driver 141 may provide an interface to management processor 110 through which management processor 110 may instruct host processor 120 to establish address ranges associated with peer-to-peer data transfers for one or more of the PCIe endpoint devices of the compute unit. Driver 141 may also provide functionality for the host processor to provide the address ranges associated with peer-to-peer data transfers to the management processor 110 or the PCIe switches 150 of the PCIe fabric 151 for use in populating address traps. Driver 141, other drivers or software may also provide an API for user software and operating systems to interact with driver 141 to issue PCIe fabric enabled peer-to-peer data transfer instructions to PCIe endpoints.

Figure 2:
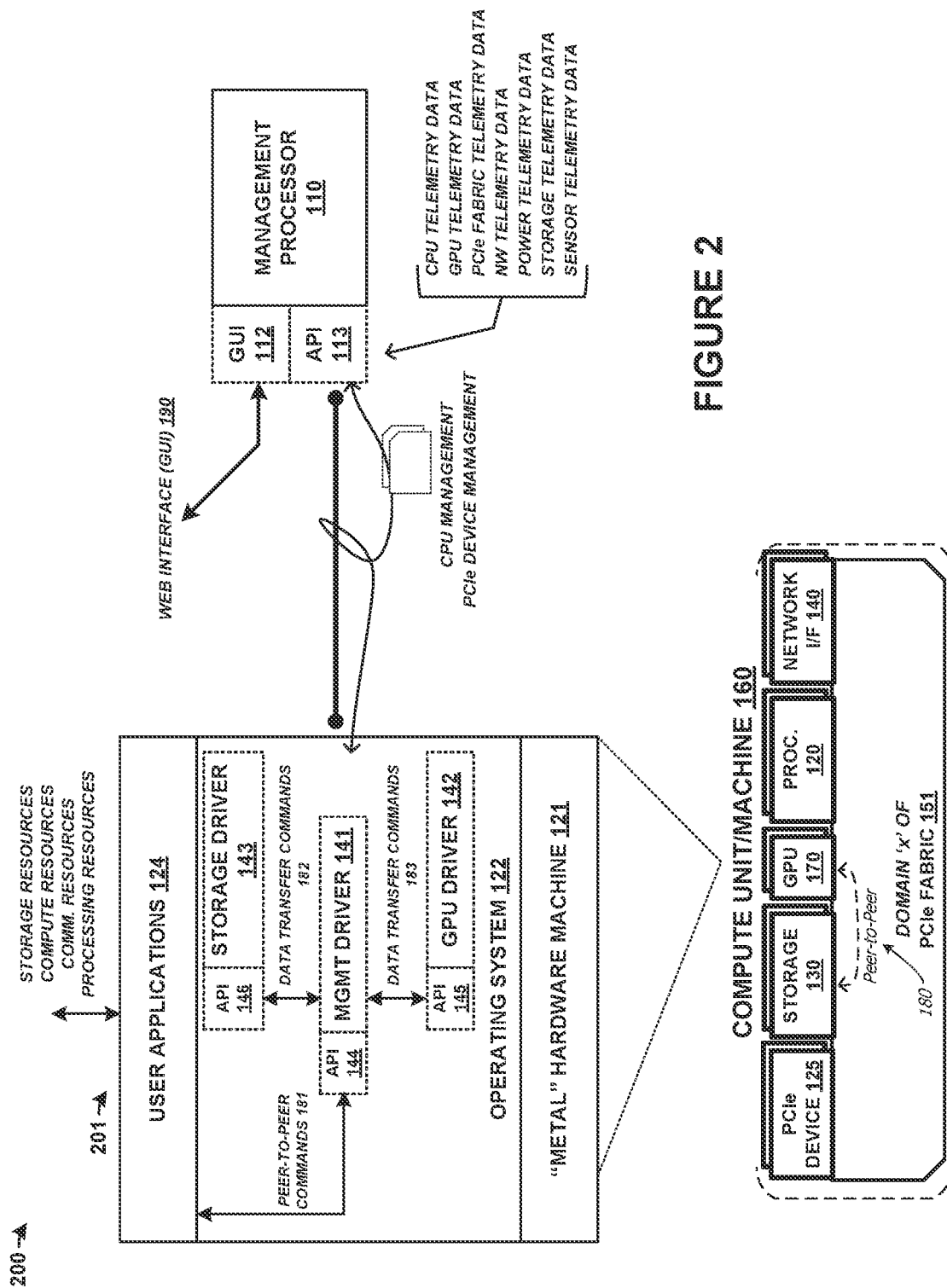
FIG. 2 is a diagram illustrating management of a computing platform in an implementation.

FIG. 2 is a system diagram that includes further details on elements from FIG. 1. System 200 includes a detailed view of an implementation of processing module 120 as well as management processor 110.

In FIG. 2, processing module 120 can be an exemplary processor in any compute unit or machine of a cluster. Detailed view 201 shows several layers of processing module 120. A first layer 121 is the hardware layer or "metal" machine infrastructure of processor processing module 120. A second layer 122 provides the OS as well as management driver 141 and API 144; GPU driver 142 and API 145; and storage driver 143 and API 146. Finally, a third layer 124 provides user-level applications. View 201 shows that user applications can access storage, processing (CPU, GPU, or FPGA), and communication resources of the cluster, such as when the user application comprises a clustered storage system or a clustered processing system.

As discussed above, driver 141 provides an emulated network device for communicating over a PCIe fabric with management processor 110 (or other processor elements). This may be performed as Ethernet traffic transported over PCIe. In such a case, a network stack is not employed in driver 141 to transport the traffic over PCIe. Instead, driver 141 may appear as a network device to an operating system or kernel to each processing module 120. User-level services/applications/software can interact with the emulated network device without modifications from a normal or physical network device. However, the traffic associated with the emulated network device is transported over a PCIe link or PCIe fabric, as shown. API 113 can provide a standardized interface for the management traffic, such as for control instructions, control responses, telemetry data, status information, or other data.

In addition, management driver 141 may operate as an interface between device drivers of PCIe devices of the compute unit to facilitate PCIe fabric enabled peer-to-peer relationship 180. In the illustrated example, compute unit 160 is configured to allow for peer-to-peer data transfers using peer-to-peer relationship 180 between storage device 130 and GPU 170. Accordingly, management driver 141 may provide a command library and API for user applications or the operating system to request such peer-to-peer data transfers. For example, the command library may provide a command that initiates PCIe fabric enabled peer-to-peer data transfers between PCIe devices. When a user application or the operating system requests such a peer-to-peer data transfer, management driver 141 may operate to interface with and issue commands to the device drivers of the PCIe devices, such as GPU driver 142 with API 145 and storage driver 143 with API 146. More particularly, management driver 141 may issue commands to the PCIe device drivers through, for example, the APIs of those PCIe device drivers in such a way that the PCIe devices perform data transfers using a specified address or addresses within an established peer-to-peer address range. Control elements within corresponding PCIe switch circuitry are configured to monitor for addresses in the established peer-to-peer address ranges, data transfers may be "trapped" by the PCIe switch circuitry and then redirected to a receiver PCIe device without passing through the host processor or the host processor memory.

While illustrated as a management driver 141 interfacing with PCIe device drivers to provide the above described functionality in the example of FIG. 2, other arrangements are possible. For example, a single device driver may be configured to direct peer-to-peer transfers or each PCIe device driver may be modified to include peer-to-peer commands to similar to management driver 141.

In FIG. 2, GPU driver 142 comprises a device driver present on a host processor of a compute unit which interfaces with a GPU assigned to the compute unit. GPU driver 142 can receive commands and data via API 145. These commands can include read/write commands, direct memory access (DMA) style of commands, configuration commands, initialization commands, or other commands used to interact with the hardware of a GPU. DMA commands comprise instructions to a PCIe device, such as a GPU, to transfer data to or from a memory location of the host processor. When interfacing with a particular GPU, this GPU will previously have been assigned an address range during an enumeration process performed during boot of the host processor.

An enumeration process discovers the PCIe device as able to communicate with the host processor, and initializes the PCIe device in the host processor for later interaction over a corresponding PCIe interface. This enumeration process also includes the host processor assigning a base address register (BAR) and address range or space within a system memory space of the host processor. This BAR and address range is used for memory mapped access to the PCIe device, and does not typically correspond to physical memory or RAM coupled to the host processor. When applications desire to interface with the PCIe device, such as GPU, these applications typically interact with an API or interface of the device driver, such as API 145 of device driver 142 for a GPU. The application can issue commands through the API for handling by the PCIe device, such as reads, writes, data transfers, data processing commands, status information requests, configuration changes, or other commands.

Although the preceding discussion related to the context of GPU driver 142 and a GPU device, it should be understood that similar functionality can be provided for storage driver 143 and API 146, or other device drivers, such as those for PCIe devices 125 or network interfaces 140 in FIG. 1. In some examples, storage driver 143 comprises an NVMe driver or similar storage device driver for interfacing with one or more data storage drives or data storage devices. More than one device driver can be provided in a host processor, which will depend upon the actual hardware configuration established for a compute unit and upon which PCIe devices are enumerated during a boot process of the host processor.

In FIG. 2, management driver 141 can act as a liaison or interworking unit between user applications 124 and device drivers, such as GPU driver 142 and storage driver 143. Applications 124 can interface with API 144 of management driver 141 to issue one or more commands 181 for data transfer among PCIe devices using a peer-to-peer arrangement discussed herein. Management driver 141 interfaces with appropriate device drivers to issue data transfer commands 182-183 using the existing device drivers. However, management driver 141 is aware of peer-to-peer relationship 180 established between selected PCIe devices and can issue these commands 182-183 to the device drivers to enact the peer-to-peer transfers. This typically entails using special addresses or address ranges established for the PCIe devices which are separate and different from the memory mapped address ranges established by the host processor during boot and enumeration. These address ranges can be referred to as 'virtual' in that they do not relate directly to physical layer addressing, and instead are abstracted into a system memory space associated with the host processor. Thus, for each PCIe device for which a peer-to-peer functionality is to be established, management driver 141 will establish an address range for peer-to-peer transfers. This address range for each PCIe device is then communicated by management driver 141 to a PCIe fabric control element (such as management processor 110) which establishes one or more address traps for these address ranges within the corresponding PCIe fabric.

Figure 3:
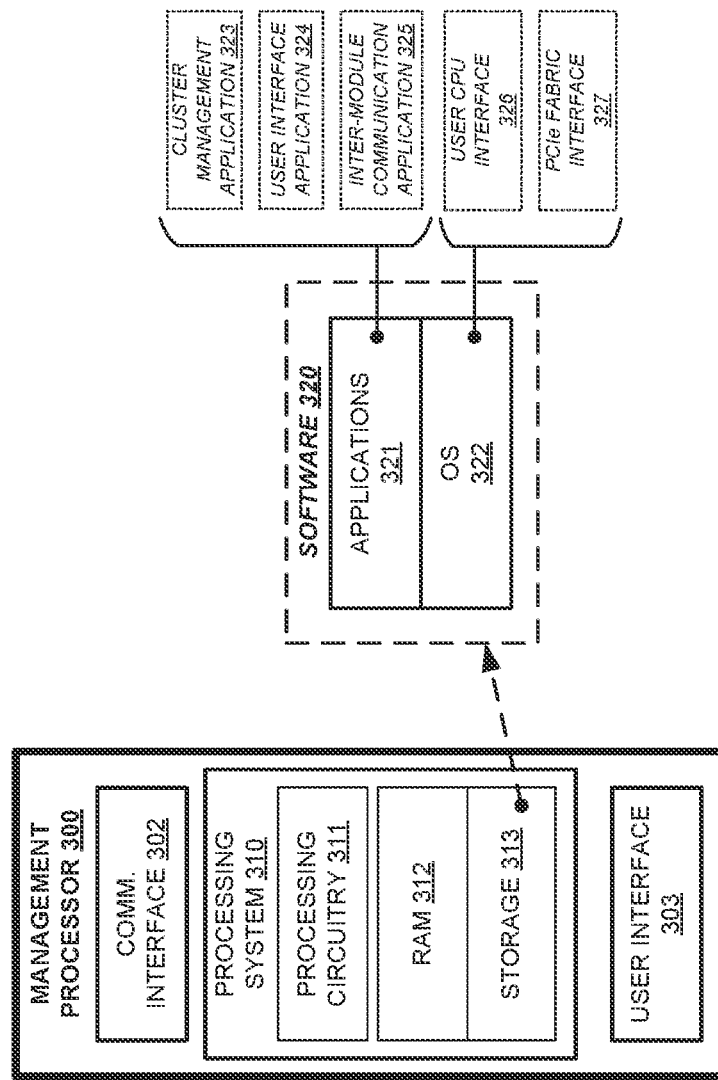
FIG. 3 is a block diagram illustrating a management processor in an implementation.

FIG. 3 is a block diagram illustrating management processor 300. Management processor 300 illustrates an example of any of the management processors discussed herein, such as processor 110 of FIG. 1. Management processor 300 includes communication interface 302, user interface 303, and processing system 310. Processing system 310 includes processing circuitry 311, random access memory (RAM) 312, and storage 313, although further elements can be included.

Processing circuitry 311 can be implemented within a single processing device but can also be distributed across multiple processing devices or sub-systems that cooperate in executing program instructions. Examples of processing circuitry 311 include general purpose central processing units, microprocessors, application specific processors, and logic devices, as well as any other type of processing device. In some examples, processing circuitry 311 includes physically distributed processing devices, such as cloud computing systems.

Communication interface 302 includes one or more communication and network interfaces for communicating over communication links, networks, such as packet networks, the Internet, and the like. The communication interfaces can include PCIe interfaces, Ethernet interfaces, serial interfaces, serial peripheral interface (SPI) links, inter-integrated circuit (I2C) interfaces, universal serial bus (USB) interfaces, UART interfaces, wireless interfaces, or one or more local or wide area network communication interfaces which can communicate over Ethernet or Internet protocol (IP) links. Communication interface 302 can include network interfaces configured to communicate using one or more network addresses, which can be associated with different network links. Examples of communication interface 302 include network interface card equipment, transceivers, modems, and other communication circuitry.

User interface 303 may include a touchscreen, keyboard, mouse, voice input device, audio input device, or other touch input device for receiving input from a user. Output devices such as a display, speakers, web interfaces, terminal interfaces, and other types of output devices may also be included in user interface 303. User interface 303 can provide output and receive input over a network interface, such as communication interface 302. In network examples, user interface 303 might packetize display or graphics data for remote display by a display system or computing system coupled over one or more network interfaces. Physical or logical elements of user interface 303 can provide alerts or visual outputs to users or other operators. User interface 303 may also include associated user interface software executable by processing system 310 in support of the various user input and output devices discussed above. Separately or in conjunction with each other and other hardware and software elements, the user interface software and user interface devices may support a graphical user interface, a natural user interface, or any other type of user interface.

RAM 312 and storage 313 together can comprise a non-transitory data storage system, although variations are possible. RAM 312 and storage 313 can each comprise any storage media readable by processing circuitry 311 and capable of storing software and OS images. RAM 312 can include volatile and nonvolatile, removable and non-removable media implemented in any method or technology for storage of information, such as computer readable instructions, data structures, program modules, or other data. Storage 313 can include non-volatile storage media, such as solid state storage media, flash memory, phase change memory, or magnetic memory, including combinations thereof. RAM 312 and storage 313 can each be implemented as a single storage device but can also be implemented across multiple storage devices or sub-systems. RAM 312 and storage 313 can each comprise additional elements, such as controllers, capable of communicating with processing circuitry 311.

Software stored on or in RAM 312 or storage 313 can comprise computer program instructions, firmware, or some other form of machine-readable processing instructions having processes that when executed a processing system direct processor 300 to operate as described herein. For example, software 320 can drive processor 300 to receive user commands to establish clusters comprising compute blocks among a plurality of physical computing components that include processing modules, storage modules, and network modules. Software 320 can drive processor 300 to receive and monitor telemetry data, statistical information, operational data, and other data to provide telemetry to users and alter operation of clusters according to the telemetry data or other data. Software 320 can drive processor 300 to manage cluster and compute/graphics unit resources, establish domain partitioning or NT partitioning among PCIe fabric elements, and interface with individual PCIe switches, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

System software 320 illustrates a detailed view of an example configuration of RAM 312. It should be understood that different configurations are possible. System software 320 includes applications 321 and operating system (OS) 322. Software applications 323-326 each comprise executable instructions which can be executed by processor 300 for operating a cluster controller or other circuitry according to the operations discussed herein.

Specifically, cluster management application 323 establishes and maintains clusters and compute units among various hardware elements of a computing platform, such as seen in FIG. 1. User interface application 324 provides one or more graphical or other user interfaces for end users to administer associated clusters and compute units and monitor operations of the clusters and compute units. Inter-module communication application 325 provides communication among other processor 300 elements, such as over I2C, Ethernet, emulated network devices, or PCIe interfaces. User CPU interface 326 provides communication, APIs, and emulated network devices for communicating with processors of compute units, and specialized driver elements thereof. PCIe fabric interface 327 establishes various logical partitioning or domains among PCIe switch elements, controls operation of PCIe switch elements, and receives telemetry from PCIe switch elements. PCIe fabric interface 327 also establishes address traps or address redirection functions within a PCIe fabric. PCIe fabric interface 327 can interface with one or more PCIe switch circuitry elements to establish address ranges which are monitored and redirected, thus forming address traps in the PCIe fabric.

Software 320 can reside in RAM 312 during execution and operation of processor 300, and can reside in storage system 313 during a powered-off state, among other locations and states. Software 320 can be loaded into RAM 312 during a startup or boot procedure as described for computer operating systems and applications. Software 320 can receive user input through user interface 303. This user input can include user commands, as well as other input, including combinations thereof.

Storage system 313 can comprise flash memory such as NAND flash or NOR flash memory, phase change memory, magnetic memory, among other solid state storage technologies. As shown in FIG. 3, storage system 313 includes software 320. As described above, software 320 can be in a non-volatile storage space for applications and OS during a powered-down state of processor 300, among other operating software.

Processor 300 is generally intended to represent a computing system with which at least software 320 is deployed and executed in order to render or otherwise implement the operations described herein. However, processor 300 can also represent any computing system on which at least software 320 can be staged and from where software 320 can be distributed, transported, downloaded, or otherwise provided to yet another computing system for deployment and execution, or yet additional distribution.

The systems and operations discussed herein provide for dynamic assignment of computing resources, graphics processing resources, network resources, or storage resources to a computing cluster. The compute units are disaggregated from any particular cluster or compute unit until allocated by users of the system. Management processors can control the operations of the cluster and provide user interfaces to the cluster management service provided by software executed by the management processors. A cluster includes at least one "machine" or computing unit, while a compute unit include at least a processor element. Computing units can also include network interface elements, graphics processing elements, and storage elements, but these elements are not required for a computing unit.

Processing resources and other elements (graphics processing, network, storage, FPGA, or other) can be swapped in and out of computing units and associated clusters on-the-fly, and these resources can be assigned to other computing units or clusters. In one example, graphics processing resources can be dispatched/orchestrated by a first computing resource/CPU and subsequently provide graphics processing status/results to another compute unit/CPU. In another example, when resources experience failures, hangs, overloaded conditions, then additional resources can be introduced into the computing units and clusters to supplement the resources.

Processing resources can have unique identifiers assigned thereto for use in identification by the management processor and for identification on the PCIe fabric. User supplied software such as operating systems and applications can be deployed to processing resources as-needed when the processing resources are initialized after adding into a compute unit, and the user supplied software can be removed from a processing resource when that resource is removed from a compute unit. The user software can be deployed from a storage system that the management processor can access for the deployment. Storage resources, such as storage drives, storage devices, and other storage resources, can be allocated and subdivided among compute units/clusters. These storage resources can span different or similar storage drives or devices, and can have any number of logical units (LUNs), logical targets, partitions, or other logical arrangements. These logical arrangements can include one or more LUNs, iSCSI LUNs, NVMe targets, or other logical partitioning. Arrays of the storage resources can be employed, such as mirrored, striped, redundant array of independent disk (RAID) arrays, or other array configurations can be employed across the storage resources. Network resources, such as network interface cards, can be shared among the compute units of a cluster using bridging or spanning techniques. Graphics resources (e.g. GPUs) or FPGA resources can be shared among more than one compute unit of a cluster using NT partitioning or domain-based partitioning over the PCIe fabric and PCIe switches.

Figure 4:
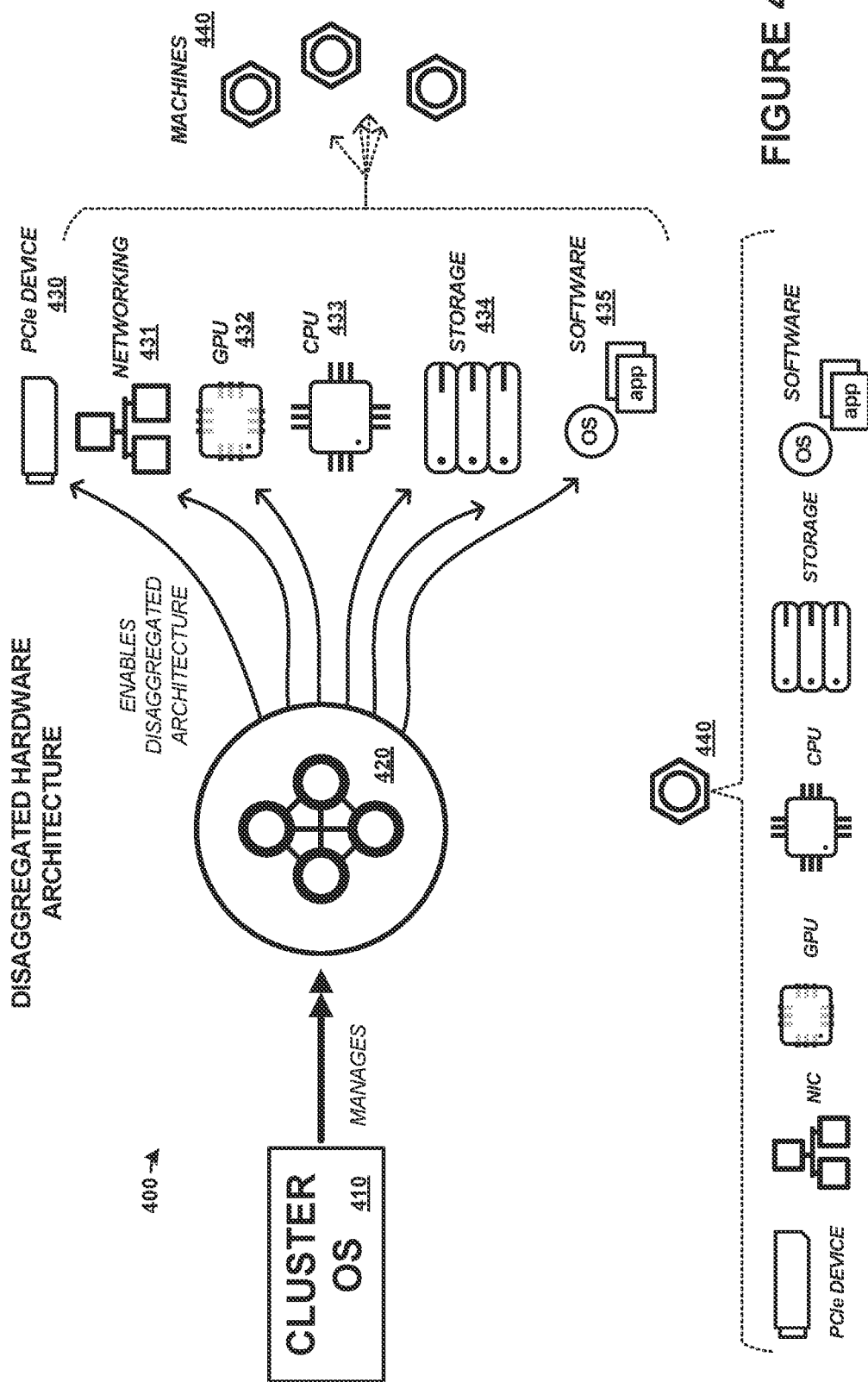
FIG. 4 illustrates example cluster management implementations.
Figure 5:
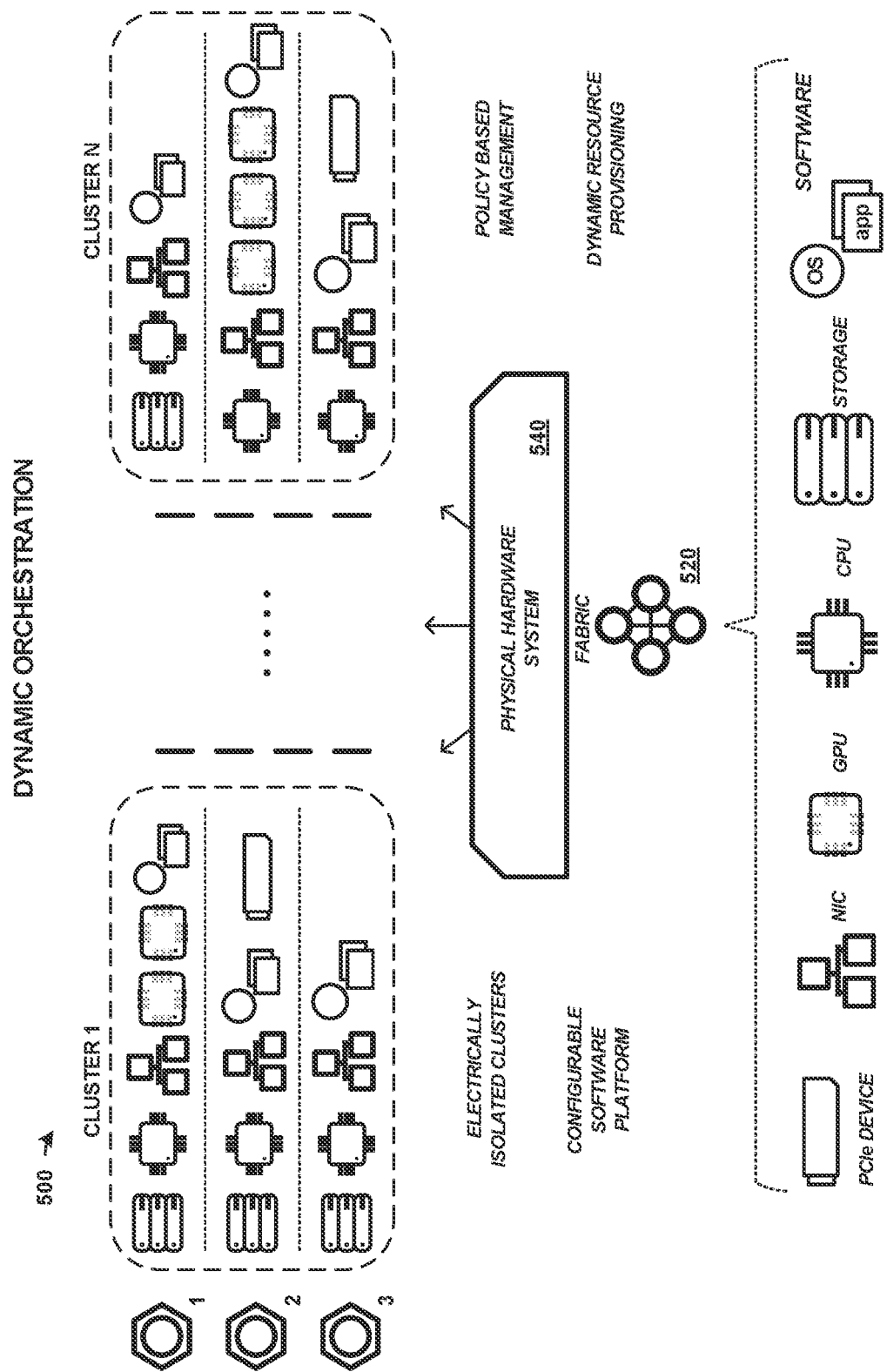
FIG. 5 illustrates example cluster management implementations.

FIGS. 4 and 5 include further detail on a disaggregated computing architecture, such as discussed herein in FIG. 1 for computing platform 100. More particularly, FIGS. 4 and 5 detail example configurations and methods of operating a disaggregated computing architecture. These examples include operating compute units in a clustered environment. The clusters can be formed using one or more compute units that each include a plurality of physical computing components communicatively coupled over a Peripheral Component Interconnect Express (PCIe) fabric. The plurality of physical computing components can be referred to herein as PCIe devices. Although PCIe device 430 is one example of a PCIe device which might comprise a FPGA device or memory device, PCIe device 430 can instead represent any PCIe-compliant device. It should be understood that any of the plurality of physical computing components discussed herein can comprise PCIe devices, whether they comprise PCIe hosts or PCIe endpoints.

The physical computing components include at least PCIe devices, FPGA devices, memory devices, central processing units (CPUs), storage modules, graphics processing modules (GPUs), and network interface modules. These physical computing components are all communicatively coupled over a PCIe fabric. The PCIe fabric can isolate the compute units from each other or within clusters in the clustered environment using logical partitioning within the PCIe fabric. Moreover, software components can be deployed by a management processor to at least an associated CPU within each of the compute units responsive to formation of the compute units. Various monitoring functions can be included in the deployed software components, and telemetry can be reported to the management processor related to operation of the compute units.

In some examples, a network driver function of the software component is included that emulates operation of a network interface, such as an Ethernet interface, to an operating system of an associated CPU of a compute unit for transfer of communications comprising at least the telemetry to the management processor over the PCIe fabric. The network driver function can include functionality for transferring communications over the PCIe fabric for delivery to the management processor without processing the communications through a network stack.

Based at least on the logical partitioning of the PCIe fabric, the compute units have visibility over the PCIe fabric to only a subset of the plurality of physical computing components assigned to each of the compute units within the PCIe fabric. Each particular compute unit lacks visibility over the PCIe fabric to other physical computing components that are communicatively coupled over the PCIe fabric and not assigned to the particular compute unit. However, the logical partitioning can also be configured to form clusters of compute units, where the compute units of the cluster can have visibility to other compute units of the cluster over the PCIe fabric, but be partitioned from having visibility to compute units not of the cluster. Typically, a management processor is configured to instruct the PCIe fabric to establish the logical partitioning within the PCIe fabric by at least forming domain-based PCIe segregation among ports of PCIe switches that comprise the PCIe fabric.

However, the management processor can be configured to instruct the PCIe fabric to establish the logical partitioning within the PCIe fabric by at least forming non-transparent (NT) port-based PCIe segregation among ports of PCIe switches that comprise the PCIe fabric.

Dynamic alterations to the composition of the compute units and compute clusters can also be achieved. These dynamic alterations can be responsive to user instructions, command line interface instructions, graphical user interface indications received from users, or by automated processes that detect performance of the compute units and compute clusters. For example, responsive to alteration of the logical partitioning by the management processor, the disaggregated platform changes a composition of the plurality of physical computing components within a compute unit. The composition of the plurality of physical computing components within a compute unit can be altered to include at least one more PCIe device, FPGA, CPU, GPU, storage module, and network interface module. The composition of the plurality of physical computing components within a compute unit can be altered to reduce a quantity of a PCIe device, FPGA, CPU, GPU, storage module, and network interface module included in the compute unit.

Moreover, clusters can be altered to increase or decrease the number of compute units included therein, such as to increase processing power of a cluster by adding more compute units on-the-fly. Thus, both compute units and clusters can be managed dynamically for enhanced responsiveness to workload, user requirements, scheduling, and other considerations. Since the physical computing components are all coupled via a flexible and configurable PCIe fabric, the physical computing components can be spun-up and spun-down as-needed and in response to various conditions and requirements. In a specific example, a compute unit might not initially be formed with an FPGA or GPU, but later requirements or workload changes might warrant inclusion of a FPGA or GPU or more than one FPGA or GPU into the compute unit. The PCIe fabric partitioning can be altered on-the-fly to allow one or more FPGAs or GPUs to be associated with the CPU or CPUs of the particular compute unit.

FIG. 4 illustrates a disaggregated infrastructure 400 highlighting cluster management operating system (OS) 410 executed by a management processor and control of PCIe fabric 420. The management OS provides for the management, automation, and orchestration of storage, compute, GPU, and network elements on PCIe-based fabrics. For example, PCIe device elements 430, storage elements 434, central processing elements (CPU) 433, graphics processing elements (GPU) 432, and network interface card (NIC) elements 431 are all able to be communicatively coupled over PCIe fabric 420. The PCIe fabric enables the disaggregated architecture by providing a partition-able communication medium for coupling the various elements into compute units and grouping the compute units into clusters.

To provide the disaggregated architecture, FIG. 4 illustrates a pool of free elements (430-434) that have not yet been assigned to a particular "machine" 440 or compute unit and operating systems and applications 435 present on the free pool of elements (431-434) or that may be deployed to storage devices for use in machines 440. The free elements are physically present in the associated system but remain idle or unassigned to a particular cluster/machine/compute unit. The management OS can select among the free elements and assign selected ones of the free elements to a machine. Requirements for the machine, such as what tasks the machine is being employed for, can be processed by the management OS to aid in selection of proper elements among the free compute, GPU, FPGA, network, memory, and storage elements. Users can interface with graphical or command-line interfaces that allow definition or indication of the requirements or other user targets.

The management OS can select among the free elements in response to the user requests. In some examples, the management OS may deploy software 435 to storage devices to be used in a machine 440. In some examples, the management OS may respond user instructions that specify a particular software 435 to deploy to a storage device. In other examples, the user instructions may include one or more fields that identify characteristics for software 435 to be deployed and the management OS may be configured to select software 435 that matches the identified characteristics. Further, in some examples, the user instructions may specify the storage device to receive software 435 while, in other examples, the management OS may select the storage device, for example, based on user specifications. In addition, where the management OS selects software 435 and storage device, the management OS may determine whether a free pool storage device already includes software 435 such that the free pool storage device may be allocated to machine 440 without deployment operations.

The management OS may operate to select software 435 and free pool elements based on characteristics specified by the user. In such examples, the management OS can learn to recognize various requests for elements and select suitable elements from the free pool. For example, the management OS can recognize particular user-provided configuration data, such as operating systems, user-provided applications, or user-provided FPGA programming files, and select certain free elements to include in one or more machines based on that recognition. In one example, the operating system to be executed by a particular machine might be specified by a user to be a Linux operating system. Particular elements can be selected from the free pool to enable the machine to run the Linux operating system. User applications, operating systems, storage requirements, interface or traffic requirements, or other considerations can be used to select elements to include in each machine. In another example, a particular FPGA programming state or programming file might be selected for deployment to an FPGA device to be included in machine 440.

Once the free pool elements are selected, the management OS may operate to perform additional configuration of the compute unit (e.g. configuring the PCIe switches of the PCIe fabric to provide PCIe fabric enabled peer-to-peer data transfers for one or more pairs of PCIe devices of the compute unit).

FIG. 5 illustrates clustered operation during dynamic "bare metal" orchestration. Several machines are shown for each cluster, with associated machines comprised of physical elements/resources 540 such as CPUs, FPGAs, GPUs, NICs, and storage drives and software deployed thereto. The clusters are electrically isolated using PCIe fabric 520, and a management system can dynamically pull elements/resources from a pool of free elements, such as seen in FIG. 4. Thus, one or more physical enclosures, such as a rack-mounted hardware arrangement, can have many elements (i.e. several processors, FPGAs, network interfaces, GPUs, and storage drives) and these elements can be allocated dynamically among any number of clusters and associated compute units/machines.

FIG. 5 illustrates example clusters, 1-N, with any number of clusters possible depending upon the availability of resources to be assigned to machines of the clusters.

Although each cluster is shown to have three machines, it should be understood that more or less than three machines per cluster can be utilized. Moreover, each machine in each cluster indicates example elements assigned thereto. These assigned elements can change dynamically according to policy based management, user commands, user instructions, preemptive or predictive allocation, idle/spin-down based removal, or other considerations. One or more management services or control processors can be configured to perform this establishment and alteration of machines and clusters using the PCIe fabric as a medium to couple the various elements dynamically.

Figure 6:
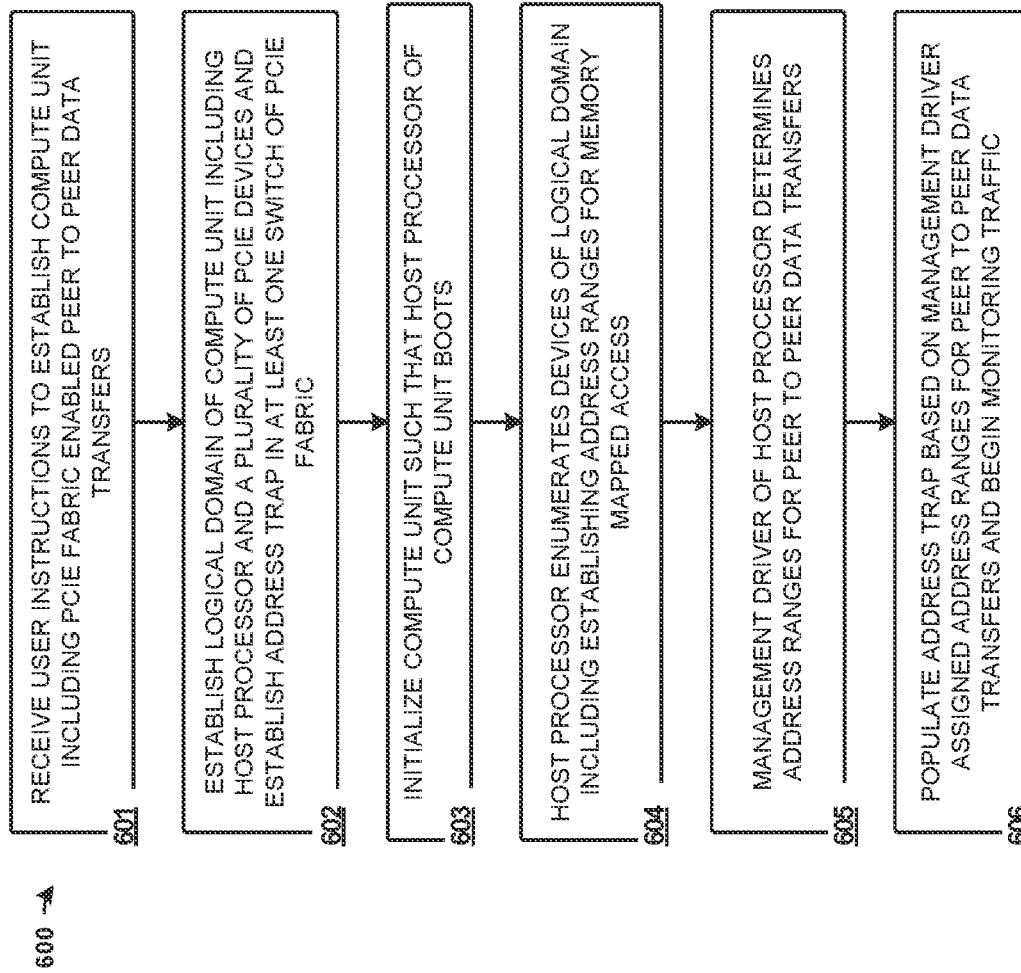
FIG. 6 includes a flow diagram that illustrates an operational example of PCIe fabric enabled peer-to-peer data transfers in compute units in an implementation.
Figure 7:
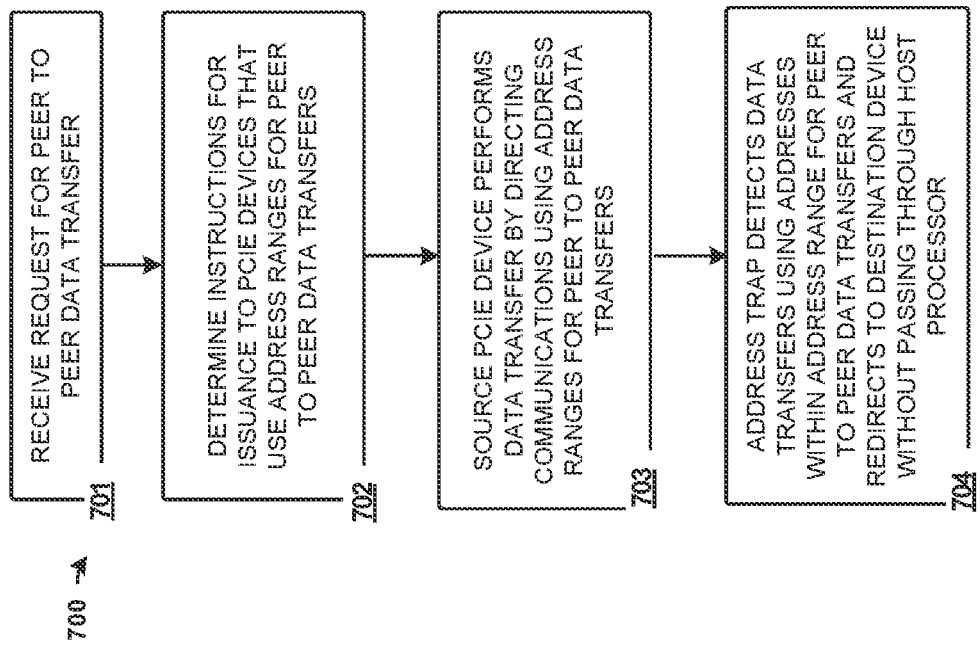
FIG. 7 includes a flow diagram that illustrates an operational example of PCIe fabric enabled peer-to-peer data transfers in compute units in an implementation.
Figure 8:
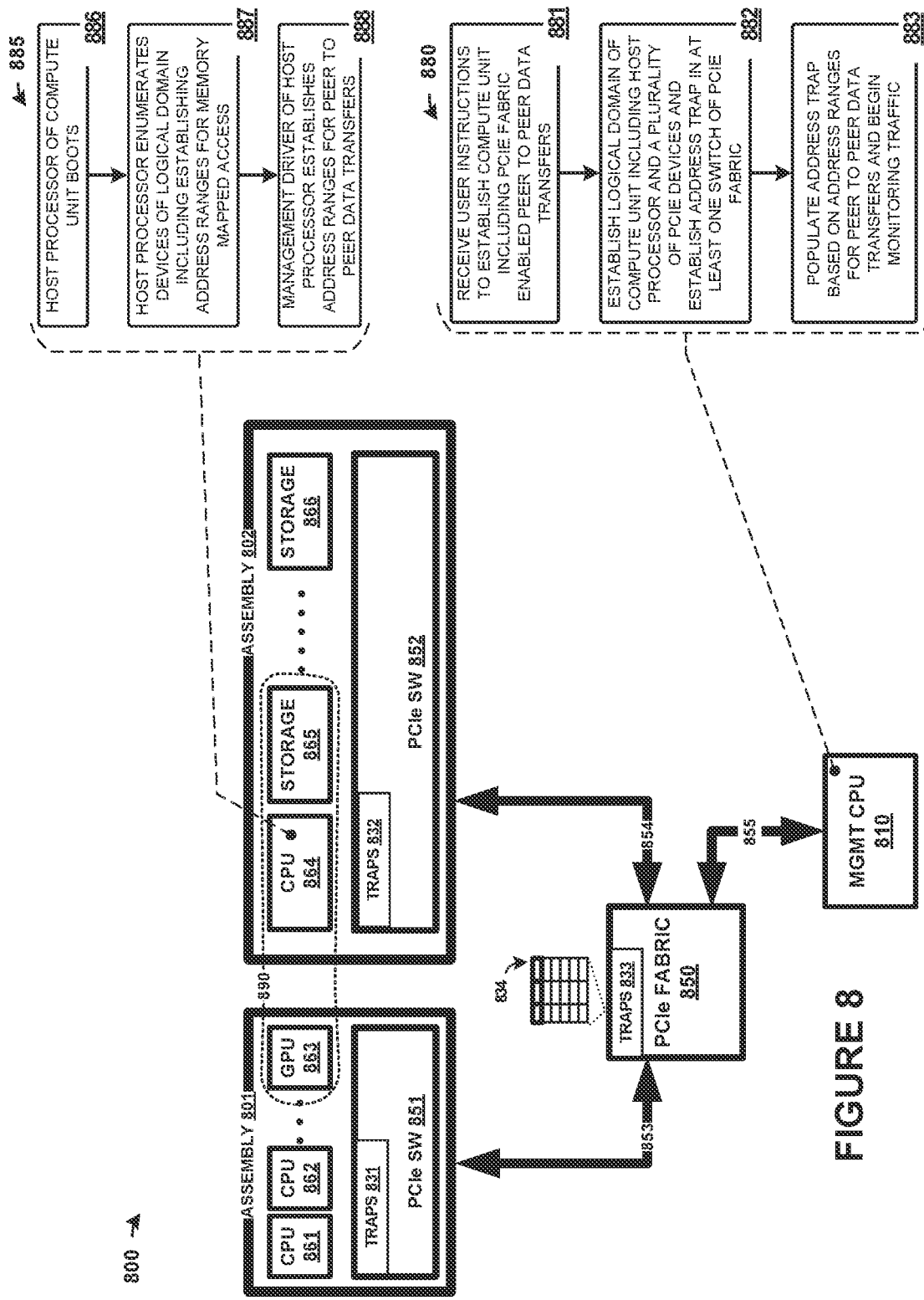
FIG. 8 is a diagram illustrating components of a computing platform in an implementation.
Figure 9:
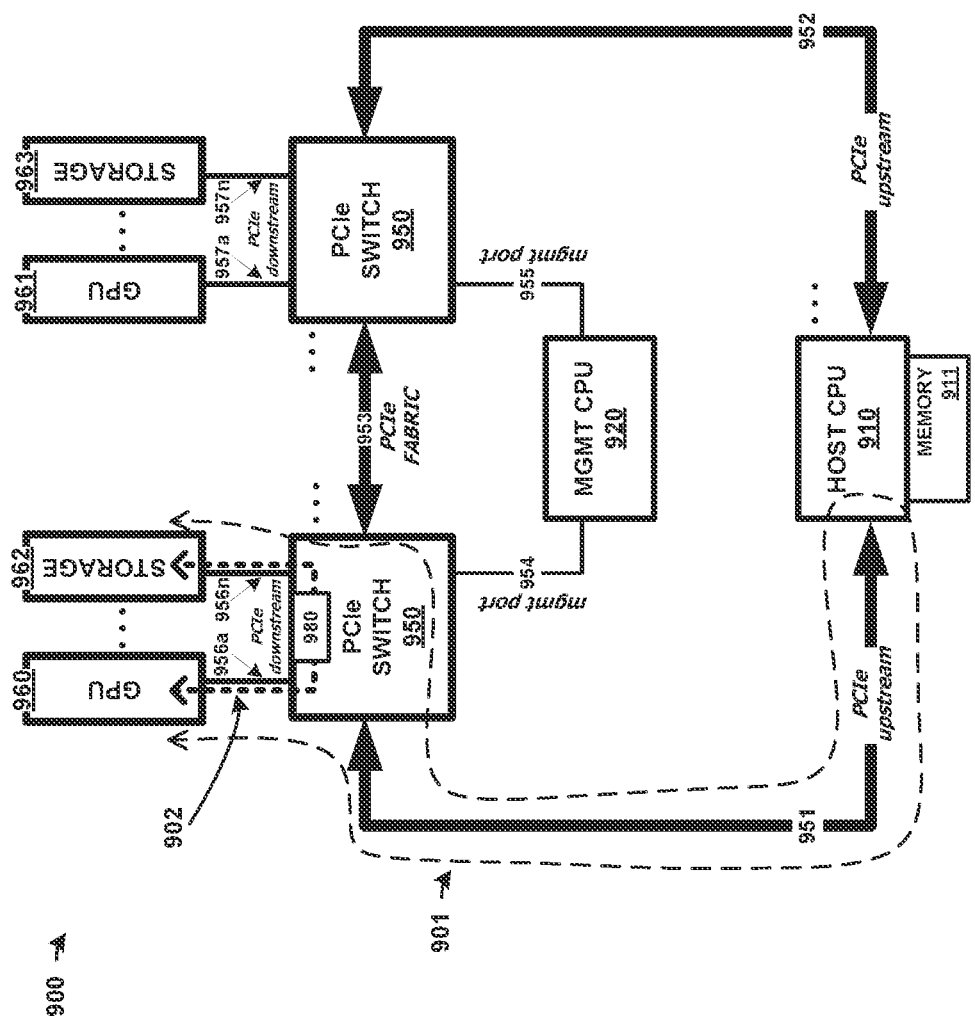
FIG. 9 is a diagram illustrating components of a computing platform in an implementation.

As previously discussed, in some examples, the computing platform may provide for PCIe fabric enabled peer-to-peer data transfers among PCIe devices in compute units. Peer-to-peer operations are discussed herein. FIGS. 6-7 provide a flow diagrams for use in platforms and systems which may provide for PCIe fabric enabled peer-to-peer data transfers in compute units. FIGS. 8 and 9 illustrate the operation of the flow diagrams of FIGS. 6 and 7 in the context of computing platforms.

FIG. 6 includes a flow diagram that illustrates an operational example of PCIe fabric enabled peer-to-peer data transfers in compute units for any of the systems discussed herein, such as for platform 100 of FIG. 1, system 200 of FIG. 2, or processor 300 of FIG. 3. In FIG. 6, operations will be discussed in context of elements of FIGS. 1 and 2, although the operations can also apply to those in FIG. 3.

Management processor 110 may receive (601) user instructions to establish a compute unit including PCIe fabric enabled peer-to-peer data transfer functionality. For example, the user instructions may be received via a user interface as part of user instructions to establish a cluster or may be received in instructions to establish a specific compute unit. In some examples, the user instructions may specify one or more pairs of PCIe devices for which peer-to-peer data transfer functionality should be enabled. In other examples, the user instructions may operate to establish peer-to-peer data transfer links for all PCIe devices in the compute unit. Further, in some examples, the user instructions may selectively specify a directionality of peer-to-peer data transfer links. Moreover, depending on the implementation, each address range for the peer-to-peer data transfer may be specific to a particular source PCIe device and destination PCIe device or may be usable for a destination PCIe device and any other PCIe device.

Upon receiving the user instructions to establish the compute unit, management processor 110 may establish (602) a logical PCIe domain that includes host processor 120 and a plurality of PCIe devices (e.g. storage devices, GPUs, NICs, FPGAs, etc.). Various examples for establishing logical domains in PCIe and similar communication systems are discussed above. Referring to previous examples, this may operate add devices into the logical domain from the free pool of devices. Establishing a logical PCIe domain may provide PCIe physical layer visibility between the PCIe devices of the domain. While establishing the logical domain, the management processor 110 may further establish one or more address traps in the PCIe fabric. These one or more address traps are established within at least one PCIe switch within the PCIe fabric. Depending on the implementation, the PCIe fabric may already have an address trap function enabled or management processor 110 may enable the functionality while establishing the logical domain. Once the address trap functionality is enabled, management processor 110 may configure the PCIe fabric such that the address trap functionality is prepared to be populated by a control process or management driver executed by the host processor.

Management processor 110 may then initialize (603) the compute unit such that the host processor of the compute unit boots and begins to operate.

Host processor 120 may discover and enumerate (604) PCIe devices in the logical domain of the compute unit and establish system memory address ranges for each discovered/enumerated PCIe device. These system memory address ranges are provided for memory mapped access to the PCIe devices, such as by applications executed on the host processor. Typically, a base address register (BAR) will be established for each PCIe device enumerated and an accompanying address range with be assigned starting from that base address. This enumeration and address assignment process can be performed by various elements of a host processor, such as boot software/firmware, or instead may be handled by basic input/output system (BIOS) circuitry or functionality, among other elements associated with the host processor. Following the enumeration and boot of the host processor into an operating system, management driver 141 may interface with management processor 110 (such as over interface 113) to determine what PCIe fabric enabled peer-to-peer data transfer functionality is to be provided. Management driver 141 may then determine (605) address ranges for each peer-to-peer data relationship to be established. For example, the host processor may establish a virtual addresses/ranges for memory mapped access to each PCIe device. Management driver 141 will then determine additional virtual addresses/ranges for each PCIe device for which peer-to-peer data transfers are to be established. These additional addresses/ranges are referred to herein as peer-to-peer address ranges.

Management processor 110 then can use the peer-to-peer address ranges to populate (606) address traps which establish the PCIe fabric enabled peer-to-peer data transfer functionality. For example, management processor 110 may populate control circuitry or control elements within various PCIe switches of the PCIe fabric to establish address look-up tables (LUTs) for the address traps. These LUTs indicate relationships between the peer-to-peer address ranges (for each destination PCIe device to enabled with peer-to-peer data transfer functionality) and physical PCIe addresses/ranges of corresponding destination PCIe devices.

The compute unit may then be prepared for peer-to-peer data transfer operation. FIG. 7 provides an example flow diagram for the handling of a peer-to-peer data transfer in a compute unit established according to FIG. 6. FIG. 7 includes a flow diagram that illustrates an operational example of PCIe fabric enabled peer-to-peer data transfers in compute units for any of the systems discussed herein, such as for platform 100 of FIG. 1, system 200 of FIG. 2, or processor 300 of FIG. 3. In FIG. 7, operations will be discussed in context of elements of FIGS. 1 and 2, although the operations can also apply to those in FIG. 3.

In FIG. 7, management driver 141 receives (701) a request for a PCIe fabric enabled peer-to-peer data transfer between two PCIe devices. This request might be issued by an application executed by a host processor of the compute unit which indicates that a peer-to-peer transfer is desired. Management driver 141 determines (702) instructions to issue to a device driver associated with a source PCIe device or initiator PCIe device. These instructions indicate addresses corresponding to the peer-to-peer address ranges. The device driver for the source PCIe device then uses these addresses corresponding to the peer-to-peer address ranges. The device driver for the source PCIe device issues instructions to the source PCIe device to initiate a peer-to-peer data transfer. These instructions indicate one or more target addresses corresponding to the peer-to-peer address ranges.

The source PCIe device then performs (703) the data transfer by directing communications to the one or more target addresses. The PCIe device is typically not aware that these one or more target addresses correspond to an address trap established in the PCIe fabric, and will perform the data transfer as the source PCIe device normally would for a non-peer-to-peer transfer. The one or more target addresses correspond to a target PCIe device, but comprise virtual addresses previously determined by management driver 141 which are separate and different than virtual addresses determined for the target PCIe device by a host processor during device enumeration. The source PCIe device may perform the data transfer as a direct memory access (DMA) data transfer. Instead of this DMA traffic being directed to the host processor, the address trap redirects this traffic through the PCIe fabric to the target PCIe device—bypassing the host processor. The address trap performs one or more address translation functions discussed below.

An address trap of one of the PCIe switches detects (704) the data transfer as using an address from the address ranges for peer-to-peer data transfers. The address trap may redirect the detected PCIe data transfer to the destination PCIe device without passing through host memory or the host processor. For example, the address trap may refer to an address table of relationships between address ranges for peer-to-peer data transfers and corresponding physical PCIe address of the corresponding PCIe device.

FIGS. 8 and 9 illustrate the operation of the processes discussed above with regard to FIGS. 6 and 7 in the context of computing platforms 800 and 900. For sake of brevity, the entire discussion of the processes of FIGS. 6-7 will not be repeated and the discussion of FIGS. 6-7 may be used for additional details for the operations discussed with regard to FIGS. 8 and 9.

FIG. 8 is presented to illustrate an example of the operation of the process discussed above with regard to FIG. 6 in the context of a computing platform. In FIG. 8, computing platform 800 is presented and performs operations 880 and 885. Computing platform 800 includes a management CPU 810, PCIe fabric 850, as well assemblies 801-802 that house a plurality associated CPUs, GPUS and storage devices 861-866 as well as corresponding PCIe switches 851-852, respectively. Assemblies 801-802 might comprise any chassis, rackmount or "just a box of disks" (JBOD) assemblies. A number of PCIe links interconnect the elements of FIG. 8, namely PCIe links 853-855. In some examples, PCIe link 855 may comprise a special control/management link that enables administrative or management-level access of control to PCIe fabric 850. However, it should be understood that similar links to the other PCIe links can instead be employed. PCIe switches 851 and 852 and the switches of the PCIe fabric 850 may each include one or more address traps 831-833.

These address traps comprise an address monitoring portion and, depending on the implementation, an address translation portion. The address monitoring portion monitors PCIe destination addresses in PCIe frames or other PCIe traffic to determine if one or more addresses of the address ranges established for PCIe fabric enabled peer-to-peer data transfers are encountered. If addresses within the peer-to-peer address ranges are encountered, then the address traps redirect the PCI traffic to a PCIe device associated with the peer-to-peer address range in which the encountered address fell. For example, the address translation portion may translate the original destination addresses that fall within a peer-to-peer address range established for peer-to-peer data transfers into a physical PCIe destination addresses of the destination PCIe device associated with the peer-to-peer address range, and transfer the PCIe traffic for delivery to the translated PCIe destination addresses.

Address traps 831-833 can include one or more address translation tables or other data structures, such as example table 834, that map translations between incoming destination addresses and outbound destination addresses that are used to modify PCIe addresses accordingly. Table 834 may contain entries that translate addressing from the peer-to-peer address ranges established for peer-to-peer data transfers to physical PCIe addresses of the destination PCIe device associated with the address range into which the incoming destination address falls. However, implementations are not limited to these examples. Alternatively, or in addition, the address traps 831-833 or table 834 may operate in various other manners to reroute a trapped data transfer to the destination PCIe device without passing through the host processor or host memory. For example, in some implementations, the address trap may comprise a content addressable memory (CAM) or ternary CAM storing one or more lookup tables (LUTs).

Turning to the operation of the computing platform 800, the management CPU 810 may perform the operations 880 while the Host CPU 864 may perform operations 885. As discussed below, these operations interact to establish a compute unit with PCIe fabric enabled peer-to-peer data transfers.

In operation 881, the management CPU 810 may receive user instructions to establish a compute unit including PCIe fabric enabled peer-to-peer data transfer functionality. In operation 882, the management CPU 810 may establish a logical domain 890 for the compute unit. This may include allocating physical resources for the compute unit including GPU 863, CPU 864 and storage device 865. The management CPU 810 may then establish the logical domain for the allocated physical resources of the compute unit including GPU 863, CPU 864 and storage device 865. While establishing the logical domain, management CPU 810 may further establish one or more address traps in the PCIe fabric. These one or more address traps are established within at least one PCIe switch within the PCIe fabric. In particular, the management CPU 810 may establish address traps 831-833 to provide PCIe fabric enabled peer-to-peer data transfer functionality for the compute unit once it is initialized. Once the address trap functionality is established, management processor 110 may configure the PCIe fabric such that the address trap functionality is prepared to be populated by a control process or management driver executed by the host processor.

The operations then turn to operations 885 of host CPU 864. In operation 886, host CPU 864 of the compute unit boots and begins to operate. In operation 887, host processor 864 may discover and enumerate PCIe devices in the logical domain of the compute unit. In the current example, the host processor 864 discovers and enumerates GPU 863, storage unit 865 and PCIe switches 851-852. During the enumeration, the host CPU 864 may establish system memory address ranges for each discovered/enumerated PCIe device of the compute unit.

In operation 888, following the enumeration and boot of the host processor into an operating system, management driver 141 may interface with management processor 110 (such as over interface 113) to determine what PCIe fabric enabled peer-to-peer data transfer functionality is to be provided. Management driver 141 may determine establish address ranges for each peer-to-peer relationship to be established.

In operation 883, management CPU 810 can use the peer-to-peer address ranges to populate address traps 831-833 in the PCIe switches 851 and 852 and the PCIe switches of the PCIe fabric 850 to establish the PCIe fabric enabled peer-to-peer data transfer functionality. In some examples, the switches may populate the address traps by creating relationships between each peer-to-peer address range and a physical PCIe address of the PCIe device corresponding to the peer-to-peer address range.

FIG. 9 illustrates components of computing platform 900 in an implementation. Computing platform 900 includes several elements communicatively coupled over a PCIe fabric formed from various PCIe links 951-953 and one or more PCIe switch circuits 950. Host processors or central processing units (CPUs) can be coupled to this PCI fabric for communication with various elements, such as those discussed in the preceding Figures. In FIG. 9, a PCIe domain that includes host CPU 910, PCIe devices 960-963, namely GPUs 960-961 and storage devices 962-963 will be discussed. GPUs 960-961 each comprise graphics processing circuitry and PCIe interface circuitry. Storage devices 962-963 each comprise storage device circuitry and PCIe interface circuitry.

Management CPU 920 can comprise control circuitry, processing circuitry, and other processing elements. Management CPU 920 can comprise elements of management processor 110 in FIGS. 1-2 or management processor 300 of FIG. 3. In some examples, management CPU 920 can be coupled to a PCIe fabric or to management/control ports on various PCIe switch circuitry, or incorporate the PCIe switch circuitry or control portions thereof. Management CPU 920 can communicate with PCIe switches 950 over management links 954-955. These management links comprise PCIe links, such as x1 or x4 PCIe links, and may comprise I2C links, network links, or other communication links.

Management processor (CPU) 920 can establish a peer-to-peer arrangement between the PCIe devices. For example, management CPU 920 may establish a PCIe fabric enabled peer-to-peer relationship at least in part by establishing address trap 980 in the PCIe fabric. Address traps, such as address trap 980, can include one or more address translation tables or other data structures that map translations between incoming destination addresses and outbound destination addresses that are used to modify PCIe addresses accordingly. Such tables may contain entries that translate addressing from the peer-to-peer address ranges established for peer-to-peer data transfers to physical addresses of the destination PCIe device associated with the peer-to-peer address range into which the incoming destination address falls. However, implementations are not limited to these examples. Alternatively, or in addition, the tables may operate in various other manners to reroute a trapped peer-to-peer data transfer to the destination PCIe device without passing through the host processor. During enumeration, the host CPU 910 may provide physical device addresses for each of the PCIe devices 960-963 and then host CPU 910 may determine address ranges associated with each PCIe fabric enabled peer-to-peer relationship to be established. Address trap 980, once populated with records mapping peer-to-peer address ranges to the corresponding PCIe addresses for PCIe devices 960-963, may allow user applications operating on host CPU 910 to initiate a peer-to-peer data transfers among two or more PCIe devices 960-963 in platform 900. More particularly, a user application operating on host CPU 910 may issue a peer-to-peer data transfer command provided by a library associated with a management driver operating on the host CPU 910. The management driver may then interface with device drivers of one or more of the PCIe devices identified by the peer-to-peer data transfer command to initiate the peer-to-peer data transfer.

Without a peer-to-peer arrangement, for example, traffic between PCIe devices 960-963 is typically routed through a host processor. This can be seen in FIG. 9 as communication link 901 which shows communications between GPU 960 and storage device 962 being routed over PCIe links 951 and 956, PCIe switch 950, and host CPU 910. Latency can be higher for this arrangement, as well as other bandwidth reductions by handling the traffic through many links, switch circuitry, and processing elements.

The peer-to-peer data transfer functionality enable the PCIe devices 960-963 to communicate more directly with each other to bypass transferring communications through host CPU 910. For example, address trap 980 allows for GPU 960 to communicate more directly with storage device 962, bypassing links 951 and host CPU 910. Less latency is encountered as well as higher bandwidth communications. This peer-to-peer relationship is shown in FIG. 9 as peer-to-peer communication link 902.

Many variations of the above processes can be achieved. For example, while the example processes discussed above operates based on user instructions to establish and operate a compute unit or cluster including instructions to establish a PCIe fabric enabled peer-to-peer arrangement between a GPU and a storage device, other examples may provide similar functionality for any other PCIe device, such as FPGAs, NICs, and so on. Further, while the address traps are configured when establishing the compute unit and populated following a boot procedure in the above examples, other examples may configure and populate the address traps after the host processor boots. For example, the management processor may configure the host processor to establish the address ranges for peer-to-peer data transfers and establish and populate the address traps, without intervention of the management processor other than the initial instructions to the host processor.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. A system comprising:
a management processor configured to initiate a communication arrangement between a first endpoint device coupled to a communication fabric and a second endpoint device coupled to the communication fabric;
wherein the communication arrangement is configured to redirect a transfer from the first endpoint device based on an address corresponding to an address range of the second endpoint device without passing the transfer through a host processor coupled to the communication fabric that executes an application initiating the transfer.

2. The system of claim 1, wherein the communication arrangement is established in the communication fabric comprising one or more communication switch circuits.

3. The system of claim 1, wherein the first endpoint device comprises a Graphics Processing Unit (GPU) and the second endpoint device comprises a storage device.

4. The system of claim 1, wherein the communication arrangement is further established to detect an additional transfer from the second endpoint device to one or more addresses corresponding to an address range for the first endpoint device, and redirect the additional transfer to the first endpoint device without passing the additional transfer through the host processor that initiates the additional transfer.

5. The system of claim 1, wherein the address range of the second endpoint device is in addition to a memory mapped address range assigned to the second endpoint device within a memory space of the host processor during enumeration of the second endpoint device by the host processor.

6. The system of claim 1, wherein the transfer is initiated by a request originated by the application executed by the host processor to transfer data from the first endpoint device to the second endpoint device via a command that employs the communication arrangement.

7. The system of claim 1, wherein a management driver executed by the host processor interfaces with a first device driver associated with the first endpoint device at least to initiate a direct memory access (DMA) transfer via the first device driver with a destination address corresponding to the address range for the second endpoint device.

8. The system of claim 1, wherein the communication arrangement redirects the transfer from the first endpoint device directed to the one or more addresses corresponding to the address range for the second endpoint device at least in part by translating the one or more addresses into physical addresses of the second endpoint device.

9. A method comprising:
initiating a communication arrangement between a first endpoint device coupled to a communication fabric and a second endpoint device coupled to the communication fabric;
wherein the communication arrangement is configured to redirect a transfer from the first endpoint device based on an address corresponding to an address range of the second endpoint device without passing the transfer through a host processor coupled to the communication fabric that executes an application initiating the transfer.

10. The method of claim 9, wherein the communication arrangement is established in a communication fabric comprising one or more communication switch circuits.

11. The method of claim 9, wherein the first endpoint device comprises a Graphics Processing Unit (GPU) and the second endpoint device comprises a storage device.

12. The method of claim 9, wherein at least one transfer is initiated by a request originated by the application executed by the host processor to transfer data from the first endpoint device to the second endpoint device via a command that employs the communication arrangement.

13. The method of claim 9, wherein a management driver of the host processor interfaces with a first device driver associated with the first endpoint device at least to initiate a direct memory access (DMA) transfer via the first device driver with a destination address corresponding to the address range for the second endpoint device.

14. The method of claim 9, wherein the communication arrangement redirects the transfer from the first endpoint device directed to the one or more addresses corresponding to the address range for the second endpoint device at least in part by translating the one or more addresses into physical addresses of the second endpoint device.

15. An apparatus comprising:
one or more computer readable storage media;
program instructions stored on the one or more computer readable storage media, that when executed by a processor, direct the processor to at least:
receive, via a user interface, instructions to initiate a communication arrangement between a first endpoint device coupled to a communication fabric and a second endpoint device coupled to the communication fabric;
wherein the communication arrangement is configured to redirect a transfer from the first endpoint device based on an address corresponding to an address range of the second endpoint device without passing the transfer through a host processor coupled to the communication fabric that executes an application initiating the transfer.

16. The apparatus of claim 15, wherein the communication arrangement is established over a communication fabric comprising one or more communication switch circuits.

17. The apparatus of claim 15, wherein the address range of the second endpoint device is in addition to a memory mapped address range assigned to the second endpoint device within a memory space of the host processor during enumeration of the second endpoint device by the host processor.

18. The apparatus of claim 15, wherein the transfer is initiated by a request originated by the application executed by the host processor to transfer data from the first endpoint device to the second endpoint device via a command that employs the communication arrangement.

19. The apparatus of claim 15, wherein a management driver executed by the host processor interfaces with a first device driver associated with the first endpoint device at least to initiate a direct memory access (DMA) transfer via the first device driver with a destination address corresponding to the address range for the second endpoint device.

20. The apparatus of claim 15, wherein the communication arrangement redirects the transfer from the first endpoint device directed to the one or more addresses corresponding to the address range for the second endpoint device at least in part by translating the one or more addresses into physical addresses of the second endpoint device.

* * * * *